United States Patent
Terada

(10) Patent No.: US 11,299,622 B2
(45) Date of Patent: *Apr. 12, 2022

(54) POLYLACTIC ACID RESIN COMPOSITION AND POLYLACTIC ACID RESIN MOLDED ARTICLE

(71) Applicant: BIOWORKS CORPORATION, Tokyo (JP)

(72) Inventor: Takahiko Terada, Tokyo (JP)

(73) Assignee: BIOWORKS CORPORATION, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/003,206

(22) Filed: Jun. 8, 2018

(65) Prior Publication Data

US 2018/0291196 A1 Oct. 11, 2018

Related U.S. Application Data

(63) Continuation of application No. PCT/JP2016/086513, filed on Dec. 8, 2016.

(30) Foreign Application Priority Data

Dec. 8, 2015 (JP) .............................. JP2015-239688

(51) Int. Cl.
```
C08L 67/04        (2006.01)
C08K 5/20         (2006.01)
C08L 71/02        (2006.01)
C08J 3/22         (2006.01)
C08J 3/20         (2006.01)
```

(52) U.S. Cl.
CPC .............. *C08L 67/04* (2013.01); *C08J 3/203* (2013.01); *C08J 3/226* (2013.01); *C08K 5/20* (2013.01); *C08L 71/02* (2013.01); *C08J 2367/04* (2013.01); *C08J 2467/04* (2013.01); *C08L 2201/10* (2013.01)

(58) Field of Classification Search
CPC .. C08L 67/04; C08L 71/02; C08K 5/20; C08J 3/226; C08J 3/203

See application file for complete search history.

(56) References Cited

U.S. PATENT DOCUMENTS

2009/0311511 A1\* 12/2009 Obuchi ................. B29C 51/002
428/323

FOREIGN PATENT DOCUMENTS

| CN | 101175817 | 5/2008 |
|----|-----------|--------|
| CN | 102731841 | 10/2012 |
| JP | 9-157424 | 6/1997 |
| JP | 9-278991 | 10/1997 |
| JP | 2004-115051 | 4/2004 |
| JP | 2006-143829 | 6/2006 |
| JP | 2007-262422 | 10/2007 |
| JP | 2009-144127 | 7/2009 |
| JP | 2009-155489 | 7/2009 |
| JP | 2010-126643 | 6/2010 |
| JP | 2012-158658 | 8/2012 |
| JP | 2013-124301 | 6/2013 |
| JP | 2014-51646 | 3/2014 |
| JP | 2014-105306 | 6/2014 |
| JP | 2015-44984 | 3/2015 |
| WO | 2006/121056 | 11/2006 |
| WO | 2013/038770 | 3/2013 |
| WO | 2015/016197 | 2/2015 |
| WO | 2015/119155 | 8/2015 |

OTHER PUBLICATIONS

Machine translation of JP 2014-105306 (Year: 2014).\*
English machine translation of JP 2015-165016 (Year: 2015).\*
International Search Report dated Mar. 14, 2017 in International (PCT) Application No. PCT/JP2016/086513, with English translation.
International Preliminary Report on Patentability dated Aug. 21, 2018 in International (PCT) Application No. PCT/JP2016/086513, with English translation.
Extended European Search Report dated Jul. 19, 2019 in corresponding European Patent Application No. 16873061.2.
Office Action dated Sep. 28, 2020 in corresponding Chinese Patent Application No. 201680071658.9, with English Translation.
Notification of Reasons for Refusal dated Nov. 17, 2020 in corresponding Japanese Patent Application No. 2017-555126, with English Translation.
Chinese Office Action dated May 11, 2021, in Chinese Patent Application No. 201680071658.9, with English language translation.
Notification of Reasons for Refusal dated Jun. 29, 2021 in corresponding Japanese Patent Application No. 2017-555126, with English translation.
Office Action dated Nov. 19, 2021 in corresponding Chinese Patent Application No. 201680071658.9, with English Translation.
Information Offer Form received Oct. 26, 2021 in corresponding Japanese Patent Application No. 2017-555126, with English translation.

\* cited by examiner

*Primary Examiner* — John E Uselding
(74) *Attorney, Agent, or Firm* — Wenderoth, Lind & Ponack, L.L.P.

(57) ABSTRACT

A polylactic acid resin composition is obtained by melting a mixture containing 100 parts by weight of a poly-L-lactic acid (A) having an L-lactic acid purity of 99 mol % or more, 2.6 to 10 parts by weight of a plasticizer (B), and 0.3 to 1.0 part by weight of a lubricant (C), then cooling the mixture to 20 to 40° C., and then heating the mixture to 46 to 70° C., and satisfies the following conditions (a) and (b):
  (a) a haze value at a thickness of 0.3 mm is 5% or less; and
  (b) the degree of crystallinity measured by a differential scanning calorimeter is 50 to 70%.

10 Claims, No Drawings

POLYLACTIC ACID RESIN COMPOSITION AND POLYLACTIC ACID RESIN MOLDED ARTICLE

CROSS-REFERENCE TO RELATED APPLICATIONS

This application is based upon and claims the benefit of priority from the prior Japanese Patent Application No. 2015-239688, filed on Dec. 8, 2015 and International Patent Application No. PCT/JP2016/086513, filed on Dec. 8, 2016, the entire content of each of which is incorporated herein by reference.

BACKGROUND OF THE INVENTION

1. Field of the Invention

The present invention relates to a polylactic acid resin composition and a molded article formed from the composition. More specifically, the present invention relates to a polylactic acid resin composition capable of achieving both high crystallinity and transparency, and a molded article formed from the composition.

2. Description of the Related Art

Conventionally, a plastic has been used in fields of various casings, containers, and packages. Particularly, a transparent plastic material has been used for a container requiring capability of visually recognizing contents, such as a food container. As a transparent plastic material, polystyrene, polyethylene terephthalate, or the like has been used.

However, due to a recent change in a food culture or the like, a need for heat resistance of a plastic is increasing, for example, in a case where contents in a plastic container are warmed with a microwave oven. Polyethylene terephthalate having high transparency has heat resistance of about 60° C. or lower and cannot be heated with a microwave oven or the like. In addition, oriented polystyrene (OPS) has heat resistance of 80° C., and therefore oriented polystyrene is used for a top lid of a container heated with a microwave oven or the like. However, for example, in a case where the contents contain oil or heating time is long, the temperature may be easily higher than 80° C., and the OPS container may be damaged.

Meanwhile, in order to enhance heat resistance, it has been studied to orient polyethylene terephthalate (O-PET) or to make opaque polypropylene transparent with a transparent nucleating agent. However, each case has heat resistance of 110° C. or lower and a haze value indicating transparency of 10% or more, and there is no versatile plastic material that can achieve both transparency and heat resistance.

Meanwhile, examples of a highly transparent plastic material include a polylactic acid resin. The polylactic acid resin is a semi-crystalline material but is hardly crystallized. Therefore, the polylactic acid resin is amorphous in a normal molding cycle and has heat resistance of only about 50° C. Crystallinity can be enhanced by thermally treating (annealing) amorphous polylactic acid or molding amorphous polylactic acid with a high-temperature die of higher than 80° C. However, if crystallization is enhanced, amorphous polylactic acid usually becomes clouded, opalescent, and opaque. In addition, in crystallization in a die, molding and crystallization of a softened resin occur competitively. Therefore, there is a problem in moldability, for example, an edge of a molded article becomes more rounded than a designed shape to deteriorate shaping.

Patent document 1 describes a method for adding a fatty acid carboxylic acid amide to an aliphatic polyester such as polylactic acid. However, the degree of crystallinity reaches 33%, but a haze is 6.5%, and a result achieving both sufficient degree of crystallinity and transparency has not been obtained.

Patent document 2 describes a method for blending polyethylene glycol with a polylactic acid resin. However, patent document 2 describes improvement of liquidity, but does not describe improvement of crystallinity or maintenance of transparency.

Patent document 3 describes a method for adding a castor oil-based fatty acid ester to a polylactic acid resin. However, the degree of crystallinity of a molded article before a heat treatment is as low as less than 30%, and the haze value thereof is also more than 8% in all the cases. A result achieving both sufficient degree of crystallinity and transparency has not been obtained.

Patent document 4 describes a method for improving crystallinity and transparency by blending a plasticizer and a crystal nucleating agent containing a fatty acid amide with a biodegradable resin containing a polylactic acid resin. However, in this case as well, there is no example of achieving degree of crystallinity of more than 30% and a haze value of 5% or less, and a result achieving both sufficient degree of crystallinity and transparency has not been obtained.

CITATION LIST

Patent Document

[patent document 1] JP 9-278991 A
[patent document 2] JP 2012-158658 A
[patent document 3] JP 2006-143829 A
[patent document 4] JP 2007-262422 A

SUMMARY OF THE INVENTION

The present invention has been achieved in view of such circumstances, and an object of the present invention is to provide a polylactic acid resin composition or a molded article having good degree of crystallinity and excellent transparency.

In order to solve the above problems, in a method for obtaining a polylactic acid resin composition by melting a mixture obtained by mixing a specific plasticizer and lubricant with a poly-L-lactic acid resin, then cooling the mixture, and further heating the mixture, the present inventor has found that a transparent polylactic acid resin composition having high degree of crystallinity can be obtained by controlling all of the optical purity of L-lactic acid in a poly-L-lactic acid, the blending amounts of a plasticizer and a lubricant, a cooling temperature, and a heating temperature to specific conditions. By this method, a loose crystal system is constructed while transparency is maintained in the cooling process after melting, crystal is rearranged and recrystallized by further heating under the temperature conditions, and high degree of crystallinity that exhibits high heat resistance can be realized while transparency is maintained. The present invention has been completed based on these findings. The present invention is as follows.

That is, a polylactic acid resin composition according to a first aspect of the present invention is a polylactic acid resin composition obtained by melting a mixture containing 100 parts by weight of a poly-L-lactic acid (A) having an L-lactic acid purity of 99 mol % or more, 2.6 to 10 parts by weight of a plasticizer (B), and 0.3 to 1.0 part by weight of a lubricant (C), then cooling the mixture to 20 to 40° C., and then heating the mixture to 46 to 70° C., wherein the following conditions (a) and (b).

(a) A haze value at a thickness of 0.3 mm is 5% or less.
(b) The degree of crystallinity measured by a differential scanning calorimeter is 50 to 70%.

A polylactic acid resin composition according to a second aspect of the present invention is a polylactic acid resin composition obtained by melting a mixture containing 100 parts by weight of a poly-L-lactic acid (A) having an L-lactic acid purity of 99 mol % or more, 2.6 to 10 parts by weight of a plasticizer (B), and 0.3 to 1.5 parts by weight of a lubricant (C), then cooling the mixture to lower than 20° C., and then heating the mixture to 46 to 80° C., wherein the following conditions (c) and (d).

(c) A haze value at a thickness of 0.3 mm is 5% or less.
(d) The degree of crystallinity measured by a differential scanning calorimeter is 50 to 70%.

A polylactic acid resin composition according to a third aspect of the present invention is a polylactic acid resin composition obtained by melting a mixture containing 100 parts by weight of a poly-L-lactic acid (A) having an L-lactic acid purity of 98 to 99 mol %, 2.6 to 10 parts by weight of a plasticizer (B), and 0.3 to 1.0 part by weight of a lubricant (C), then cooling the mixture to 20 to 40° C., and then heating the mixture to 46 to 60° C., wherein the following conditions (e) and (f).

(e) A haze value at a thickness of 0.3 mm is 5% or less.
(f) The degree of crystallinity measured by a differential scanning calorimeter is 35 to 55%.

A polylactic acid resin composition according to a fourth aspect of the present invention is a polylactic acid resin composition obtained by melting a mixture containing 100 parts by weight of a poly-L-lactic acid (A) having an L-lactic acid purity of 98 to 99 mol %, 2.6 to 10 parts by weight of a plasticizer (B), and 0.3 to 1.5 parts by weight of a lubricant (C), then cooling the mixture to lower than 20° C., and then heating the mixture to 46 to 80° C., wherein the following conditions (g) and (h).

(g) A haze value at a thickness of 0.3 mm is 5% or less.
(h) The degree of crystallinity measured by a differential scanning calorimeter is 35 to 55%.

DETAILED DESCRIPTION OF THE INVENTION

Hereinafter, a polylactic acid resin composition and a polylactic acid resin molded article according to an embodiment of the present invention will be described in detail. Note that the configuration described below is an example and does not limit the scope of the present invention at all.

A polylactic acid resin composition according to a first aspect of the present invention is a polylactic acid resin composition obtained by melting a mixture containing 100 parts by weight of a poly-L-lactic acid (A) having an L-lactic acid purity of 99 mol % or more, 2.6 to 10 parts by weight of a plasticizer (B), and 0.3 to 1.0 part by weight of a lubricant (C), then cooling the mixture to 20 to 40° C., and then heating the mixture to 46 to 70° C., wherein the following conditions (a) and (b).

(a) A haze value at a thickness of 0.3 mm is 5% or less.
(b) The degree of crystallinity measured by a differential scanning calorimeter is 50 to 70%.

A polylactic acid resin composition according to a second aspect of the present invention is a polylactic acid resin composition obtained by melting a mixture containing 100 parts by weight of a poly-L-lactic acid (A) having an L-lactic acid purity of 99 mol % or more, 2.6 to 10 parts by weight of a plasticizer (B), and 0.3 to 1.5 parts by weight of a lubricant (C), then cooling the mixture to lower than 20° C., and then heating the mixture to 46 to 80° C., wherein the following conditions (c) and (d).

(c) A haze value at a thickness of 0.3 mm is 5% or less.
(d) The degree of crystallinity measured by a differential scanning calorimeter is 50 to 70%.

A polylactic acid resin composition according to a third aspect of the present invention is a polylactic acid resin composition obtained by melting a mixture containing 100 parts by weight of a poly-L-lactic acid (A) having an L-lactic acid purity of 98 to 99 mol %, 2.6 to 10 parts by weight of a plasticizer (B), and 0.3 to 1.0 part by weight of a lubricant (C), then cooling the mixture to 20 to 40° C., and then heating the mixture to 46 to 60° C., wherein the following conditions (e) and (f).

(e) A haze value at a thickness of 0.3 mm is 5% or less.
(f) The degree of crystallinity measured by a differential scanning calorimeter is 35 to 55%.

A polylactic acid resin composition according to a fourth aspect of the present invention is a polylactic acid resin composition obtained by melting a mixture containing 100 parts by weight of a poly-L-lactic acid (A) having an L-lactic acid purity of 98 to 99 mol %, 2.6 to 10 parts by weight of a plasticizer (B), and 0.3 to 1.5 parts by weight of a lubricant (C), then cooling the mixture to lower than 20° C., and then heating the mixture to 46 to 80° C., wherein the following conditions (g) and (h).

(g) A haze value at a thickness of 0.3 mm is 5% or less.
(h) The degree of crystallinity measured by a differential scanning calorimeter is 35 to 55%.

In addition, in the polylactic acid resin composition according to each of the above-described aspects, the cold crystallization heat generation amount of a poly-L-lactic acid obtained by subjecting the polylactic acid resin composition after cooling and before heating to differential scanning calorimetry at a temperature rising rate of 10° C. per minute is preferably 16 J/g or more.

In addition, in the polylactic acid resin composition according to each of the above-described aspects, the cold crystallization heat generation amount of a poly-L-lactic acid obtained by subjecting the polylactic acid resin composition after heating to differential scanning calorimetry at a temperature rising rate of 10° C. per minute is preferably 5 J/g or less.

In addition, in the polylactic acid resin composition according to each of the above-described aspects, a poly-L-lactic acid preferably has a crystal particle diameter of 100 nm or less.

In addition, in the polylactic acid resin composition according to each of the above-described aspects, the plasticizer (B) preferably has a refractive index of 1.42 to 1.48 at 25° C.

In addition, in the polylactic acid resin composition according to each of the above-described aspects, the plasticizer (B) is preferably at least one selected from the group consisting of polyethylene glycol, a castor oil-based fatty acid ester, a polyoxyethylene sorbitan fatty acid ester, and a polyethylene glycol fatty acid ester, or a mixture thereof.

In addition, in the polylactic acid resin composition according to each of the above-described aspects, the lubricant (C) is preferably at least one selected from the group consisting of ethylene bishydroxystearic acid amide, N-stearyl erucic acid amide, N-stearyl stearic acid amide, ethylene bisstearic acid amide, and stearic acid amide, or a mixture thereof.

In addition, the polylactic acid resin composition according to each of the above-described aspects preferably further contains at least one selected from the group consisting of a polyglycerol fatty acid ester, a glycerol fatty acid ester, a glycerol diacetomono fatty acid ester, and a sorbitan fatty acid ester, or a mixture thereof.

In addition, in the polylactic acid resin composition according to each of the above-described aspects, the contact angle of pure water measured by a θ/2 method is preferably 60° or less.

In addition, in the polylactic acid resin composition according to each of the above-described aspects, in order to manufacture a mixture containing the poly-L-lactic acid (A), the plasticizer (B), and the lubricant (C), it is preferable to previously manufacture and provide a concentrated polylactic acid resin composition (D) obtained by kneading 25 to 100 parts by weight of the plasticizer (B) and the lubricant (C) in total with respect to 100 parts by weight of the poly-L-lactic acid (A).

In addition, the above-described concentrated polylactic acid resin composition (D) preferably further contains a poly-L-lactic acid having an L-lactic acid purity of less than 98 mol %.

In addition, a polylactic acid resin molded article according to another aspect of the present invention is formed from the above-described polylactic acid resin composition and characterized by being obtained by further heating the composition to 130 to 160° C. to soften the composition, and then molding and cooling the composition in a die.

Note that the temperature of the die is preferably 30 to 60° C.

<Polylactic Acid>

A poly-L-lactic acid used in the present embodiment is a polymer mainly containing L-lactic acid. A poly-L-lactic acid contains D-lactic acid which is an optical isomer of L-lactic acid, and a poly-L-lactic acid in first and second polylactic acid resin compositions according to the present embodiment has a content ratio of an L-lactic acid unit of 99 mol % or more in all the lactic acid components of a polylactic acid polymer. In addition, a poly-L-lactic acid in third and fourth polylactic acid resin compositions according to the present embodiment has a content ratio of an L-lactic acid unit of 98 mol % or more and less than 99 mol % in all the lactic acid components of a polylactic acid polymer.

The poly-L-lactic acid used in the present embodiment may contain a monomer other than lactic acid. However, inclusion of another monomer significantly inhibits crystallinity. Therefore, the copolymerization amount of another monomer is preferably 0 to 3 mol %, and more preferably 0 to 2 mol % with respect to the total amount of poly-L-lactic acid-based monomers.

Examples of another monomer include: a glycol such as ethylene glycol, propylene glycol, butanediol, heptanediol, hexanediol, octanediol, nonanediol, decanediol, neopentyl glycol, glycerol, pentaerythritol, bisphenol A, polyethylene glycol, polypropylene glycol, or polytetramethylene glycol; a dicarboxylic acid such as oxalic acid, adipic acid, sebacic acid, azelaic acid, dodecanedioic acid, malonic acid, glutaric acid, cyclohexanedicarboxylic acid, terephthalic acid, isophthalic acid, phthalic acid, naphthalenedicarboxylic acid, or 4,4'-diphenyl ether dicarboxylic acid; a hydroxycarboxylic acid such as glycolic acid, hydroxypropionic acid, hydroxybutyric acid, hydroxyvaleric acid, hydroxycaproic acid, or hydroxybenzoic acid, and a lactone such as caprolactone, valerolactone, propiolactone, or undecalactone.

The weight average molecular weight of the poly-L-lactic acid used in the present embodiment is preferably 50,000 to 500,000, and more preferably 100,000 to 250,000 in consideration of practical productivity and physical properties. Note that the term "weight average molecular weight" as used herein refers to a molecular weight obtained by performing measurement with a chloroform solvent by gel permeation chromatography (GPC) and calculating the measured results in terms of polystyrene.

In addition, the polylactic acid resin composition according to the present embodiment may contain a resin other than the poly-L-lactic acid. The content thereof is preferably 0 to 70% by mass, more preferably 0 to 50% by mass, and still more preferably 0 to 30% by mass with respect to the total mass.

Examples of a resin other than the poly-L-lactic acid include: a thermoplastic resin such as poly-D-lactic acid, polyethylene, polypropylene, polyamide, polyacrylate, polymethacrylate, polyester, polyacetal, polyphenylene sulfide, polyether ether ketone, polysulfone, polyphenylene oxide, polyimide, or polyether imide; and a thermosetting resin such as a phenol resin, a melamine resin, a polyester resin, a silicone resin, or an epoxy resin.

In the polylactic acid resin composition according to the present embodiment, the content of a low molecular weight lactic acid component such as lactide contained in the resin composition is preferably 0 to 0.5% by mass. The content is more preferably 0 to 0.3% by mass. The content of more than 0.5% by mass not only adversely affects the transparency of the polylactic acid resin composition but also accelerates hydrolysis of the poly-L-lactic acid resin with time and may deteriorate strength and other characteristics.

<Plasticizer>

A plasticizer used in the present embodiment facilitates molding of the polylactic acid resin composition and can further add flexibility. These effects are phenomena caused by improvement of a glass transition temperature and mobility of a molecular chain by addition of the plasticizer. The added plasticizer which has entered between polylactic acid polymer chains causes association between a polar part of the plasticizer and a polar part of the polymer, blocks the polar part of the polymer, and replaces an interaction between the polymers hindering micro-Brownian motion of the molecular chains with an interaction between the polymers and the plasticizer to relax the interaction between the polymer chains. This action widens a space between the molecular chains and releases entanglement thereof to improve mobility of the molecular chains. Molecular mobility is improved by the effect of the plasticizer, and crystallization of the poly-L-lactic acid at a lower temperature is possible.

In a case where the poly-L-lactic acid is rapidly cooled from a molten state to a certain temperature and crystallized in a static storage place, a crystal structure formed is a lamellar structure (folded chain crystal). At this time, a temperature at which the crystallization is performed is the most fundamental and important factor in forming a higher order structure of the polymer. That is, it is known that the thickness of a crystal increases as a crystallization temperature increases, and a crystal having a smaller lamella thickness is formed by crystallization at a lower temperature.

As a result, the mobility of the molecular chain can be improved by the plasticizer, and crystallization at a lower temperature is possible. Therefore, the thickness of the crystal can be small, and a more transparent composition can be molded.

As a result of intensive studies by the present inventors, the blending amount of the plasticizer is preferably 2.6 to 10 parts by weight with respect to 100 parts by weight of the poly-L-lactic acid. If the blending amount of the plasticizer is less than 2.6 parts by weight, an effect of improving the molecular mobility of the poly-L-lactic acid is small, and a practical crystallization rate cannot be obtained in a temperature range where a sufficiently thin lamella is formed. In addition, the polylactic acid resin composition is hard and brittle, and has no durability for practical use due to a small plasticizing effect. In addition, during thermal molding, shaping is difficult even at a temperature equal to or higher than a softening temperature, and heating up to a temperature range where partial melting occurs is necessary. In addition, if the blending amount of the plasticizer is more than 10 parts by weight, not only association of poly-L-lactic acid molecules is blocked, and entanglement thereof is released, but also the poly-L-lactic acid molecules are taken in crystals. This rather inhibits crystallization. In addition, the plasticizer cannot completely be dissolved in the polylactic acid resin composition due to crystallization, and a risk of bleeding out from the polylactic acid resin composition (bleeding phenomenon) increases.

In addition, the plasticizer preferably used in the present embodiment preferably has at least a refractive index of 1.42 to 1.48 at 25° C. Compatibility with the poly-L-lactic acid also affects transparency of the polylactic acid resin composition. However, by setting a difference from 1.45 which is the refractive index of the poly-L-lactic acid to ±0.03, the transparency of the polylactic acid resin composition of the present invention can be further improved. In a case where the refractive index at 25° C. is less than 1.42 or more than 1.48, the difference in refractive index between the poly-L-lactic acid and the plasticizer is large, and the transparency of the resin composition is easily lowered by light scattering based on the difference.

Examples of the plasticizer having a refractive index of 1.42 to 1.48 at 25° C. include di-2-ethylhexyl adipate, diisodecyl adipate, an adipic acid-based polyester, an epoxidized soybean oil, acetyl tributyl citrate, polyhydroxystearic acid, 2-ethylhexyl hydroxystearate, erythrityl triethylhexanoate, octyldodecyl lactate, polyethylene glycol, a castor oil-based fatty acid ester, a polyoxyethylene sorbitan fatty acid ester, and a polyethylene glycol fatty acid ester.

Among these compounds, the plasticizer (B) is preferably at least one selected from the group consisting of polyethylene glycol, a castor oil-based fatty acid ester, a polyoxyethylene sorbitan fatty acid ester, and a polyethylene glycol fatty acid ester, or a mixture thereof. In addition to having a refractive index of 1.42 to 1.48 at 25° C., these compounds have particularly excellent compatibility with the poly-L-lactic acid and do not become opaque or bleed out even if the degree of crystallinity of the polylactic acid resin composition changes and an abundance ratio of an amorphous part/crystal part changes by being cooled and heated from a molten state. Therefore, these compounds are used as a more preferable plasticizer.

In addition, these plasticizers have good compatibility with each other and can be added not only singly but also in mixture pf two or more kinds thereof to the poly-L-lactic acid.

<Lubricant>

A lubricant used in the present embodiment serves as an external lubricant to facilitate release from a die during molding of the polylactic acid resin composition, serves as an internal lubricant to improve slippage of a molecule, and can improve the mobility of a molecular chain including release of molecular entanglement. As a result, molecular mobility is improved by the effect of the lubricant, and crystallization of the poly-L-lactic acid at a lower temperature is possible.

In a case where the poly-L-lactic acid is rapidly cooled from a molten state to a certain temperature and crystallized in a static storage place, a crystal structure formed is a lamellar structure (folded chain crystal). At this time, a temperature at which the crystallization is performed is the most fundamental and important factor in forming a higher order structure of the polymer. That is, it is known that the thickness of a crystal increases as a crystallization temperature increases, and a crystal having a smaller lamella thickness is formed by crystallization at a lower temperature.

As a result, the mobility of the molecular chain can be improved by the lubricant, and crystallization at a lower temperature is possible. Therefore, the thickness of the crystal can be small, and a more transparent composition can be molded.

In addition, the lubricant used in the present embodiment also has a nuclear memory effect for suppressing shear heat generation in kneading or the like during mixing the polylactic acid resin composition as an internal lubricant and maintaining a crystal nucleus present in the poly-L-lactic acid from before kneading without melting the crystal nucleus and is more effective for accelerating crystallization of the poly-L-lactic acid.

As a result of intensive studies, the present inventor has found that the lubricant exhibits a larger effect when being used in combination with the plasticizer than when being used singly. In addition, when the lubricant is used in combination with the plasticizer, the blending amount of the lubricant is preferably 0.3 parts by weight or more with respect to 100 parts by weight of the poly-L-lactic acid. If the blending amount of the lubricant is less than 0.3 parts by weight, an effect of improving the molecular mobility of the poly-L-lactic acid as an internal lubricant is small, and a practical crystallization rate cannot be obtained in a temperature range where a sufficiently thin lamella is formed. In addition, it has become clear that the blending amount of the lubricant also depends on a temperature at which the mixture containing the poly-L-lactic acid, the plasticizer, and the lubricant is cooled after melting. That is, when the cooling temperature after melting is 20 to 40° C., the blending amount of the lubricant is preferably 1.0 part by weight or less, and when the cooling temperature after melting is 20° C. or lower, the blending amount of the lubricant is preferably 1.5 parts by weight or less. If the blending amount of the lubricant exceeds this range, the polylactic acid resin composition becomes clouded and opaque at the time of cooling or heating after melting.

Note that the lubricant is preferably at least one selected from the group consisting of ethylene bishydroxystearic acid amide, N-stearyl erucic acid amide, N-stearyl stearic acid amide, ethylene bisstearic acid amide, and stearic acid amide, or a mixture thereof. These compounds improve the molecular chain mobility of the poly-L-lactic acid as an internal lubricant while maintaining high transparency of the polylactic acid resin composition and contribute to prompt crystallization. In addition, these lubricants have good compatibility with each other and can be added not only singly but also in mixture of two or more kinds thereof to the poly-L-lactic acid.

<Other Additives>

The polylactic acid resin composition according to the present embodiment preferably further contains at least one selected from the group consisting of a polyglycerol fatty acid ester, a glycerol fatty acid ester, and a glycerol diacetomono fatty acid ester, or a mixture thereof. These compounds can impart hydrophilicity to a surface of the polylactic acid resin composition or a polylactic acid resin molded article. "Cloudiness" generated in a plastic occurs because a fine water droplet adheres to (is dew-condensed on) a substrate surface, and the water droplet scatters light. In order to prevent "cloudiness", it is only necessary to prevent generation of a water droplet. By imparting hydrophilicity to the polylactic acid resin composition, a contact angle between the polylactic acid resin composition and the water droplet is reduced, generation of the water droplet is prevented on the polylactic acid resin composition, and a film of water is generated. These effects can be expected by further inclusion of at least one selected from the group consisting of a polyglycerol fatty acid ester, a glycerol fatty acid ester, a glycerol diacetomono fatty acid ester, and a sorbitan fatty acid ester, or a mixture thereof in the polylactic acid resin composition.

Examples of the polyglycerol fatty acid ester include polyglycerol oleate, polyglycerol ricinoleate, polyglycerol laurate, polyglycerol stearate, and polyglycerol condensed ricinoleate. Examples of the glycerol fatty acid ester include glycerol hydroxy stearate, glycerol monolaurate, and glycerol oleate. Examples of the glycerol diacetomono fatty acid ester include glycerol diacetomonolaurate. Examples of the sorbitan fatty acid ester include sorbitan monostearate, sorbitan monooleate, sorbitan laurate, and sorbitan tristearate.

Incidentally, as a result of intensive studies by the present inventor, the blending amount of the polyglycerol fatty acid ester, the glycerol fatty acid ester, and the glycerol diacetomono fatty acid ester is preferably 1 to 5 parts by weight with respect to 100 parts by weight of the poly-L-lactic acid. If the blending amount is less than 1 part by weight, a hydrophilization effect on a surface of the polylactic acid resin composition is small. If the blending amount is 5 parts by weight or more, crystallization of the poly-L-lactic acid is inhibited, and cloudiness occurs. The blending amount is more preferably 1 to 3 parts by weight.

Incidentally, when the polylactic acid resin composition according to the present embodiment further contains at least one selected from the group consisting of a polyglycerol fatty acid ester, a glycerol fatty acid ester, and a glycerol diacetomono fatty acid ester, or a mixture thereof, the contact angle of pure water measured by a θ/2 method is preferably 60° or less. The contact angle of pure water on a surface of the poly-L-lactic acid is 76°. However, when the contact angle exceeds 60°, a surface of the polylactic acid resin composition or the polylactic acid resin molded article is not sufficiently hydrophilized, and cloudiness due to light scattering of a fine water droplet occurs.

In addition to the above-described plasticizer and lubricant of the present invention, the polylactic acid resin composition according to the present embodiment may contain a hydrolysis inhibitor, an antioxidant, an antistatic agent, a light stabilizer, an ultraviolet absorber, a pigment, an antibacterial agent, an antifungal agent, a foaming agent, a flame retardant, or the like within a range not hindering crystallinity or transparency as an object of the present invention. Examples of the hydrolysis inhibitor include a carbodiimide compound such as a polycarbodiimide compound, and examples thereof include a polycarbodiimide compound obtained by a reaction between a monocarbodiimide such as dicyclohexylcarbodiimide or diisopropylcarbodiimide and an organic diisocyanate. The content of the hydrolysis inhibitor is preferably 0.01 to 3 parts by weight, and more preferably 0.05 to 2 parts by weight with respect to 100 parts by weight of the polylactic acid resin composition.

<Method for Mixing Polylactic Acid Resin Composition>

For the polylactic acid resin composition according to the present embodiment, it is necessary to first mix the poly-L-lactic acid (A), the plasticizer (B), and the lubricant (C). A publicly known method and kneading technique can be applied to mixing the components. For example, when the powder-shaped or pellet-shaped poly-L-lactic acid (A) is formed into an extruded and kneaded pellet using a twin-screw extruding kneader, the plasticizer (B) and the lubricant (C) are added, heated and sheared, and mixed to obtain an extruded and kneaded pellet. The plasticizer (B) and the lubricant (C) can be fed to the twin-screw extruding kneader simultaneously with the poly-L-lactic acid and can be fed using a side feed or a liquid injection pump as necessary. Note that a heating temperature of the twin-screw extruding kneader depends on the rotational speed of the screw but is preferably 140 to 240° C. If the heating temperature is lower than 140° C., mixing is insufficient. If the heating temperature is higher than 240° C., the poly-L-lactic acid is thermally decomposed. In addition, the rotational speed of the screw is preferably 100 to 500 rpm. If the rotational speed is less than 100 pm, mixing is insufficient. If the rotational speed is more than 500 rpm, the poly-L-lactic acid is thermally decomposed.

In addition to the twin-screw extruding kneader, mixing can be performed, for example, by a method for obtaining a pellet with an extruder after batch kneading with a batch type kneader, a kneader ruder, or a kneader. In addition, for example, it is also possible to obtain a pellet by collectively mixing the poly-L-lactic acid, the plasticizer (B), and the lubricant (C) with a blender or the like, and then extruding the composition with a twin-screw extruder while the composition is heated and melted.

Incidentally, in addition to mixing the poly-L-lactic acid (A), the plasticizer (B), and the lubricant (C) at a specific concentration, it is also possible to manufacture a pellet by manufacturing the polylactic acid resin composition (D) obtained by mixing the plasticizer (B) and the lubricant (C) with the poly-L-lactic acid (A) at a high concentration and then dry-blending the polylactic acid resin composition (D) with the poly-L-lactic acid (A) or diluting the polylactic acid resin composition (D) by heating, extruding, kneading, or the like.

Incidentally, in a case where the plasticizer (B) and the lubricant (C) are added as the polylactic acid resin composition (D), the plasticizer (B) and the lubricant (C) may be mixed separately for each of the additives or simultaneously. In addition, a mixing ratio of the plasticizer (B) and the lubricant (C) in total in the polylactic acid resin composition (D) is preferably 25 to 100 parts by weight with respect to 100 parts by weight of the poly-L-lactic acid (A).

In addition, the polylactic acid resin composition (D) is more concentrated than the specific concentration of the plasticizer (B) and the lubricant (C) in the polylactic acid resin composition according to the present embodiment. Therefore, there is a concern that the plasticizer (B) and the lubricant (C) may bleed, for example, in a case where the poly-L-lactic acid has a high degree of crystallinity by being heated in a drying step or the like. In this case, if the polylactic acid resin composition (D) contains not only a poly-L-lactic acid having an L-lactic acid purity of 98 mol % to 99 mol % or 99 mol % or more but also a poly-L-lactic acid having an L-lactic acid purity of less than 98 mol %, the amount of an amorphous poly-L-lactic acid having higher compatibility increases in the polylactic acid resin composition (D), and it is possible to suppress bleeding of the plasticizer (B) and the lubricant (C). Therefore, the concentrated polylactic acid resin composition (D) preferably contains a poly-L-lactic acid having an L-lactic acid purity of less than 98 mol %.

Incidentally, as a blending ratio between the polylactic acid resin composition (D) and the poly-L-lactic acid (A), a weight ratio of polylactic acid resin composition (D)/poly-L-lactic acid (A) is 1/3 to 1/20, preferably 1/5 to 1/20, and more preferably 1/10 to 1/20.

<Method for Cooling Polylactic Acid Resin Composition>

The polylactic acid resin composition according to the present embodiment is obtained by melting the mixture containing the poly-L-lactic acid (A), the plasticizer (B), and the lubricant (C) and then cooling the mixture. It has been found that a cooling temperature has a preferable relationship with the composition of components in the polylactic acid resin composition. That is, it has been found that the preferable content of the lubricant (C) is 0.3 to 1.0 part by weight with respect to 100 parts by weight of the poly-L-lactic acid (A) in a case where the cooling temperature is 20 to 40° C., and that the preferable content is 0.3 to 1.5 parts by weight in a case where the cooling temperature after melting is lower than 20° C. Regardless of the cooling temperature, if the content of the lubricant (C) is less than 0.3 parts by weight as a preferable content, an effect of improving the molecular mobility of the poly-L-lactic acid as an internal lubricant is small, and a practical crystallization rate cannot be obtained in a temperature range where a sufficiently thin lamella is formed. In addition, in a case where the content of the lubricant (C) exceeds 1.0 part by weight with respect to 100 parts by weight of the poly-L-lactic acid (A) at a cooling temperature of 20 to 40° C. or in a case where the content of the lubricant (C) exceeds 1.5 parts by weight at a cooling temperature of lower than 20° C. after melting, the polylactic acid resin composition becomes clouded in a cooling process or a heating process following the cooling process. In addition to the case where the content of the lubricant (C) is too large, in a case where the cooling temperature after melting exceeds 40° C., the polylactic acid resin composition becomes clouded and opaque at the time of cooling or heating after melting. It has become clear that the temperature at which the mixture containing the poly-L-lactic acid, the plasticizer, the lubricant is cooled after melting also depends on the blending amount of the lubricant.

In the polylactic acid resin composition according to the present embodiment, the mixture containing the poly-L-lactic acid (A), the plasticizer (B), and the lubricant (C) can be cooled after melting by a known molding method, injection molding, extrusion molding, blow molding, injection blow molding, profile extrusion molding, inflation molding, press molding, or the like.

For example, in a case of sheet molding by an extrusion molding machine, the mixture containing the poly-L-lactic acid (A), the plasticizer (B), and the lubricant (C) discharged after melting by a T-die method is cooled while being wound with a metallic cooling roll. This can be realized by controlling the cooling temperature of the polylactic acid resin composition after melting to 20 to 40° C. or lower than 20° C. by controlling a surface temperature of the metallic cooling roll.

In a case of the above-described sheet molding, stretching can be also performed as necessary. In addition, a layer having a function such as an antistatic property, an antifogging property, pressure-sensitive adhesiveness, a gas barrier property, adhesiveness, or easy adhesiveness can be formed on a sheet surface by coating as necessary. In addition, a layer having a function such as an antistatic property, an antifogging property, pressure-sensitive adhesiveness, a gas barrier property, adhesiveness, or easy adhesiveness can be formed by laminating another resin and another sheet as necessary.

In addition, in a case of molding with an injection molding machine, the mixture containing the poly-L-lactic acid (A), the plasticizer (B), and the lubricant (C) discharged from a nozzle after melting is cooled while being molded in a metallic die. This can be realized by controlling the cooling temperature of the polylactic acid resin composition after melting to 20 to 40° C. or lower than 20° C. by controlling the temperature of the metallic die.

<Method for Heating Polylactic Acid Resin Composition>

The polylactic acid resin composition according to the present embodiment is obtained by melting the mixture containing the poly-L-lactic acid (A), the plasticizer (B), and the lubricant (C), then cooling the mixture, and then heating the mixture. It has been found that a heating temperature has a preferable relationship with the composition of components in the polylactic acid resin composition and the cooling temperature.

That is, in a case where a mixture containing 2.6 to 10 parts by weight of the plasticizer (B) and 0.3 to 1.0 part by weight of the lubricant (C) with respect to 100 parts by weight of the poly-L-lactic acid (A) having an L-lactic acid purity of 99 mol % or more is melted and then cooled to 20 to 40° C., a preferable temperature for heating following cooling is 46 to 70° C. In a case where a mixture containing 2.6 to 10 parts by weight of the plasticizer (B) and 0.3 to 1.5 parts by weight of the lubricant (C) with respect to 100 parts by weight of the poly-L-lactic acid (A) having an L-lactic acid purity of 99 mol % or more is melted and then cooled to lower than 20° C., a preferable temperature for heating following cooling is 46 to 80° C. In a case where a mixture containing 2.6 to 10 parts by weight of the plasticizer (B) and 0.3 to 1.0 part of the lubricant (C) with respect to 100 parts by weight of the poly-L-lactic acid (A) having an L-lactic acid purity of 98 to 99 mol % is melted and then cooled to 20 to 40° C., a preferable temperature for heating following cooling is 46 to 60° C. In a case where a mixture containing 2.6 to 10 parts by weight of the plasticizer (B) and 0.3 to 1.5 parts by weight of the lubricant (C) with respect to 100 parts by weight of the poly-L-lactic acid (A) having an L-lactic acid purity of 98 to 99 mol % is melted and then cooled to lower than 20° C., a preferable temperature for heating following cooling is 46 to 80° C.

In either case, in a case where the heating temperature is lower than a lower limit value thereof, the molecular mobility of the poly-L-lactic acid remains small, an improvement effect is small, and a practical crystallization rate cannot be obtained. In addition, in either case, in a case where the heating temperature exceeds an upper limit value thereof, the molecular mobility of the poly-L-lactic acid is large. Therefore, a crystal which has been sufficiently small also grows, forms a larger lamella, and further forms a spherulite or a large crystal around a newly formed crystal nucleus. Therefore, the polylactic acid resin composition becomes clouded and opaque.

In the polylactic acid resin composition according to the present embodiment, the mixture containing the poly-L- lactic acid (A), the plasticizer (B), and the lubricant (C) can be cooled after melting and further heated by performing heating online or offline after performing a known molding method or a method such as injection molding, extrusion molding, blow molding, injection blow molding, profile extrusion molding, inflation molding, or press molding.

For example, in a case of sheet molding by an extrusion molding machine, this can be realized by cooling the mixture containing the poly-L-lactic acid (A), the plasticizer (B), and the lubricant (C) discharged after melting by a T-die method while winding the mixture with a metallic cooling roll, and then heating the mixture in a thermostatic chamber. In addition, heating can be performed by conveying the mixture on a heating roll disposed at a later stage of cooling with a metallic cooling roll. The heating temperature of the polylactic acid composition can be set within a preferable temperature range such as 46 to 70° C. by controlling a heating temperature after melting and cooling the polylactic acid resin composition by controlling a surface temperature of a heating roll.

<Haze of Polylactic Acid Resin Composition>

The polylactic acid resin composition according to the present embodiment preferably has a haze of 5% or less. By setting the haze to 5% or less, sufficient transparency equivalent to that of polyethylene terephthalate or oriented polystyrene (OPS) can be realized. Note that the haze referred to in the present invention refers to a value obtained by measuring a polylactic acid resin composition having a thickness of 0.3 mm by a method in accordance with JIS K7136. In a case where the thickness is not 0.3 mm, the haze refers to a converted haze value converted into a value at a thickness of 0.3 mm and refers to a converted haze value obtained by a formula defined by H0.3(%)=H×0.3/d (H0.3: haze value (%) converted into value at thickness of 0.3 mm; H: haze measured value (%) of sample, d: sample thickness (mm) in haze measurement part). In the present embodiment, a haze value at a thickness of 0.3 mm is preferably 5% or less.

<Degree of Crystallinity of Polylactic Acid Resin Composition>

As for the degree of crystallinity of the polylactic acid resin composition according to the present embodiment, the degree of crystallinity of a polylactic acid resin composition obtained by melting a mixture containing 100 parts by weight of the poly-L-lactic acid (A) having an L-lactic acid purity of 99 mol % or more, 2.6 to 10 parts by weight of the plasticizer (B), and 0.3 to 1.0 part by weight of the lubricant (C), then cooling the mixture, and then heating the mixture is preferably 50 to 70%. In addition, the crystallinity of a polylactic acid resin composition obtained by melting a mixture containing 100 parts by weight of the poly-L-lactic acid (A) having an L-lactic acid purity of 98 to 99 mol %, 2.6 to 10 parts by weight of the plasticizer (B), and 0.3 to 1.0 part by weight of the lubricant (C), then cooling the mixture, and then heating the mixture is preferably 35 to 55%. The poly-L-lactic acid is a semi-crystalline polymer material and includes both a crystal part and an amorphous part. If the degree of crystallinity in this range is maintained, even when the amorphous part goes into a rubber state and is softened at a temperature higher than a glass transition temperature, the polylactic acid resin composition can withstand a high temperature exceeding 100° C. without being substantially deformed. Note that the degree of crystallinity according to the present embodiment refers to the degree of crystallinity obtained by measuring crystallization heat quantity (ΔHc) and melting heat quantity (ΔHm) when the polylactic acid resin composition is heated at a rate of 10° C./min using a differential scanning calorimeter (DSC) and performing calculation according to the following formula.

Degree of crystallinity (%)=(melting heat quantity−crystallization heat quantity)/93×100

<Crystal Particle Diameter of Polylactic Acid Resin Composition>

The crystal particle diameter of the polylactic acid resin composition according to the present embodiment is preferably 100 nm or less. If the crystal particle diameter is 100 nm or less, the crystal particle diameter is sufficiently smaller than a wavelength of the visible light, and a crystal contributing to heat resistance can be realized while good transparency is maintained. Note that the crystal particle diameter according to the present embodiment is a value obtained by analyzing a diffraction profile measured by a wide angle X-ray diffraction transmission method by a Scherrer method.

<Polylactic Acid Resin Molded Article>

A method for molding the polylactic acid resin composition obtained by the above method to obtain the polylactic acid resin molded article according to the present embodiment will be described below.

The molded article referred to in the present embodiment includes a container, a bag, a tube, a cup, a bottle, a tray, and the like, and there is no limitation on the shape, size, thickness, and the like thereof. Particularly, examples thereof include a container such as a blister pack, a food tray, a lunch box, or a beverage cup, and other molded articles for various packages.

As a molding method, various molding methods such as vacuum molding, vacuum pressure molding, hot plate molding, plug assist molding, straight molding, free drawing molding, plug and ring molding, and skeleton molding can be applied.

Note that the polylactic acid resin molded article according to the present embodiment has a self-extinguishing property and burns while being exposed to flame but extinguishes a fire quickly when being apart from the flame.

The polylactic acid resin molded article according to the present embodiment is obtained by first heating and softening the polylactic acid resin composition according to the present embodiment and then molding and cooling the composition in a die. A temperature for heating and softening described above is preferably 130 to 160° C. If the temperature is within this range, even if a high degree of crystallinity is maintained, elastic modulus is lowered to a sufficiently moldable value by softening of an amorphous part. The polylactic acid resin composition according to the present embodiment already has a high degree of crystallinity. Therefore, if being heated to a temperature lower than 130° C., the polylactic acid resin composition is insufficiently softened and therefore cannot be sufficiently deformed into a die shape. As a result, moldability is deteriorated. In addition, if the temperature exceeds 160° C., melting of a crystal also occurs simultaneously. Therefore, the degree of crystallinity of the polylactic acid resin molded article is lowered during a molding process, leading to a decrease in heat resistance.

The polylactic acid resin molded article according to the present embodiment is obtained by heating and softening the polylactic acid resin composition and then molding and cooling the composition in a die. The polylactic acid resin composition according to the present embodiment already has a high degree of crystallinity and still maintains a high degree of crystallinity even when being heated in a range of 130 to 160° C. Therefore, if the composition is cooled to 100° C. or lower, the composition can be released from a die without deformation, and it is unnecessary to increase the degree of crystallinity in the die by heating. Therefore, a die temperature having a glass transition temperature or lower, for example, a die temperature of about 20° C. may be used.

However, a disordered type crystal may be formed in which the crystal structure of the poly-L-lactic acid is slightly disturbed depending on heating temperature and heating time of the polylactic acid resin composition. The disordered type crystal has lower heat resistance than an ordinary crystal. Therefore, the die temperature is preferably set to 30 to 60° C. after heating in a process of molding the polylactic acid resin molded article. As a result, the crystal structure of the poly-L-lactic acid is transferred to a crystal structure with higher heat resistance.

EXAMPLES

Hereinafter, the present invention will be specifically described based on Examples, but the present invention is not limited to these Examples at all. In addition, manufacturing conditions and characteristics of polylactic acid resin compositions according to the following Examples and Comparative Examples are illustrated in Tables 1 and 2.

Example 1

100 parts by weight of a poly-L-lactic acid (Ingeo Biopolymer: 2500HP, manufactured by Nature Works, L-lactic acid purity >99 mol %), 4.7 parts by weight of polyethylene glycol (PEG-6000P, manufactured by Sanyo Chemical Industries Ltd.) as a plasticizer, and 0.53 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 200° C. to melt and soften the pellet, then discharged from a T-die, and cooled with a roll set at 32.5° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 2.5%.

In addition, the degree of crystallinity thereof measured by DSC was 52.6%. This sheet-shaped polylactic acid resin composition was immersed in a thermostatic oil bath, and a change with temperature was observed. As a result, deformation and the like were not observed even when the composition was heated to 130° C.

In addition, flammability of this polylactic acid composition was confirmed. As a result, the composition burned while being exposed to flame, but extinguished a fire quickly in less than one second when being apart from the flame. That is, the polylactic acid resin composition of Example 1 has a self-extinguishing property.

Example 2

100 parts by weight of a poly-L-lactic acid (Ingeo Biopolymer: 2500HP, manufactured by Nature Works, L-lactic acid purity >99 mol %), 10 parts by weight of polyethylene glycol (PEG-6000P, manufactured by Sanyo Chemical Industries Ltd.) as a plasticizer, and 0.53 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 150 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 190° C. to melt and soften the pellet, then discharged from a T-die, and cooled with a roll set at 32.5° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 2.8%. In addition, the degree of crystallinity thereof measured by DSC was 51.5%. This sheet-shaped polylactic acid resin composition was immersed in a thermostatic oil bath, and a change with temperature was observed. As a result, deformation and the like were not observed even when the composition was heated to 130° C.

Example 3

100 parts by weight of a poly-L-lactic acid (Ingeo Biopolymer: 2500HP, manufactured by Nature Works, L-lactic acid purity >99 mol %), 3 parts by weight of polyethylene glycol (PEG-6000P, manufactured by Sanyo Chemical Industries Ltd.) as a plasticizer, and 0.53 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 200° C. to melt and soften the pellet, then discharged from a T-die, and cooled with a roll set at 32.5° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 2.2%. In addition, the degree of crystallinity thereof measured by DSC was 55.0%. This sheet-shaped polylactic acid resin composition was immersed in a thermostatic oil bath, and a change with temperature was observed. As a result, deformation and the like were not observed even when the composition was heated to 130° C.

In addition, this polylactic acid composition was cut out, superposed, and fixed to a sample holder, and then a diffraction profile was measured by a wide angle X-ray diffraction transmission method while a holder was rotated. Analysis was performed by a Scherrer formula using a crystal peak of a poly-L-lactic acid (203) face of the profile. As a result, a crystal particle diameter was 16 nm.

Comparative Example 1

100 parts by weight of a poly-L-lactic acid (Ingeo Biopolymer: 2500HP, manufactured by Nature Works, L-lactic acid purity >99 mol %), 12 parts by weight of polyethylene glycol (PEG-6000P, manufactured by Sanyo Chemical Industries Ltd.) as a plasticizer, and 0.53 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 150 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 185° C. to melt and soften the pellet, then discharged from a T-die, and cooled with a roll set at 32.5° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like, had very high transparency and a haze value of 2.9%, but had a degree of crystallinity of 41.1% as measured by DSC, less than 50%. This sheet-shaped polylactic acid resin composition was immersed in a thermostatic oil bath, and a change with temperature was observed. As a result, the composition was deformed by its own weight by being heated to 80° C. Transparency was obtained, but sufficient heat resistance was not obtained.

Comparative Example 2

100 parts by weight of a poly-L-lactic acid (Ingeo Biopolymer: 2500HP, manufactured by Nature Works, L-lactic acid purity >99 mol %), 2.5 parts by weight of polyethylene glycol (PEG-6000P, manufactured by Sanyo Chemical Industries Ltd.) as a plasticizer, and 0.53 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 150 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 210° C. to melt and soften the pellet, then discharged from a T-die, and cooled with a roll set at 32.5° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like, had very high transparency and a haze value of 2.1%, but had a degree of crystallinity of 35.8% as measured by DSC, less than 50%. In addition, the composition was very rigid, hard, and brittle. This sheet-shaped polylactic acid resin composition was immersed in a thermostatic oil bath, and a change with temperature was observed. As a result, the composition was deformed by its own weight by being heated to 70° C. Transparency was obtained, but sufficient heat resistance was not obtained.

Example 4

100 parts by weight of a poly-L-lactic acid (Ingeo Biopolymer: 2500HP, manufactured by Nature Works, L-lactic acid purity >99 mol %), 4.7 parts by weight of polyethylene glycol (PEG-6000P, manufactured by Sanyo Chemical Industries Ltd.) as a plasticizer, and 0.3 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 200° C. to melt and soften the pellet, then discharged from a T-die, and cooled with a roll set at 32.5° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 2.1%. In addition, the degree of crystallinity thereof measured by DSC was 51.2%. This sheet-shaped polylactic acid resin composition was immersed in a thermostatic oil bath, and a change with temperature was observed. As a result, deformation and the like were not observed even when the composition was heated to 130° C.

Example 5

100 parts by weight of a poly-L-lactic acid (Ingeo Biopolymer: 2500HP, manufactured by Nature Works, L-lactic acid purity >99 mol %), 4.7 parts by weight of polyethylene glycol (PEG-6000P, manufactured by Sanyo Chemical Industries Ltd.) as a plasticizer, and 1.0 part by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 200° C. to melt and soften the pellet, then discharged from a T-die, and cooled with a roll set at 32.5° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 4.3%. In addition, the degree of crystallinity thereof measured by DSC was 60.4%. This sheet-shaped polylactic acid resin composition was immersed in a thermostatic oil bath, and a change with temperature was observed. As a result, deformation and the like were not observed even when the composition was heated to 130° C.

Comparative Example 3

100 parts by weight of a poly-L-lactic acid (Ingeo Biopolymer: 2500HP, manufactured by Nature Works, L-lactic acid purity >99 mol %), 4.7 parts by weight of polyethylene glycol (PEG-6000P, manufactured by Sanyo Chemical Industries Ltd.) as a plasticizer, and 0.2 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 200° C. to melt and soften the pellet, then discharged from a T-die, and cooled with a roll set at 32.5° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like but was slightly clouded. The haze value thereof was 7.8%. In addition, the degree of crystallinity thereof measured by DSC was 30.1%. This sheet-shaped polylactic acid resin composition was immersed in a thermostatic oil bath, and a change with temperature was observed. As a result, the composition was deformed by its own weight by being heated to 70° C. Sufficient transparency or heat resistance was not obtained.

Comparative Example 4

100 parts by weight of a poly-L-lactic acid (Ingeo Biopolymer: 2500HP, manufactured by Nature Works, L-lactic acid purity >99 mol %), 4.7 parts by weight of polyethylene glycol (PEG-6000P, manufactured by Sanyo Chemical Industries Ltd.) as a plasticizer, and 1.2 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 200° C. to melt and soften the pellet, then discharged from a T-die, and cooled with a roll set at 32.5° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like but was slightly clouded. The haze value thereof was 6.3%. In addition, the degree of crystallinity thereof measured by DSC was 58.0%. This sheet-shaped polylactic acid resin composition obtained a high degree of crystallinity but did not obtain sufficient transparency.

Example 6

100 parts by weight of a poly-L-lactic acid (Ingeo Biopolymer: 2500HP, manufactured by Nature Works, L-lactic acid purity >99 mol %), 4.7 parts by weight of polyethylene glycol (PEG-6000P, manufactured by Sanyo Chemical Industries Ltd.) as a plasticizer, and 0.53 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 200° C. to melt and soften the pellet, then discharged from a T-die, and cooled with a roll set at 32.5° C. to obtain a sheet having a thickness of 0.3 mm.

Furthermore, this sheet was allowed to stand for one day and one night in a thermostatic chamber at 60° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 2.6%. In addition, the degree of crystallinity thereof measured by DSC was 55.2%. This sheet-shaped polylactic acid resin composition was immersed in a thermostatic oil bath, and a change with temperature was observed. As a result, deformation and the like were not observed even when the composition was heated to 130° C.

Example 7

100 parts by weight of a poly-L-lactic acid (Ingeo Biopolymer: 2500HP, manufactured by Nature Works, L-lactic acid purity >99 mol %), 4.7 parts by weight of polyethylene glycol (PEG-6000P, manufactured by Sanyo Chemical Industries Ltd.) as a plasticizer, and 0.53 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 200° C. to melt and soften the pellet, then discharged from a T-die, and cooled with a roll set at 32.5° C. to obtain a sheet having a thickness of 0.3 mm.

Furthermore, this sheet was allowed to stand for one day and one night in a thermostatic chamber at 70° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 4.1%. In addition, the degree of crystallinity thereof measured by DSC was 61.4%. This sheet-shaped polylactic acid resin composition was immersed in a thermostatic oil bath, and a change with temperature was observed. As a result, deformation and the like were not observed even when the composition was heated to 130° C.

Comparative Example 5

100 parts by weight of a poly-L-lactic acid (Ingeo Biopolymer: 2500HP, manufactured by Nature Works, L-lactic acid purity >99 mol %), 4.7 parts by weight of polyethylene glycol (PEG-6000P, manufactured by Sanyo Chemical Industries Ltd.) as a plasticizer, and 0.53 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 200° C. to melt and soften the pellet, then discharged from a T-die, and cooled with a roll set at 32.5° C. to obtain a sheet having a thickness of 0.3 mm.

Furthermore, this sheet was allowed to stand for one day and one night in a thermostatic chamber at 80° C. to obtain a polylactic acid resin composition. The appearance, haze value, and degree of crystallinity of this polylactic acid composition were measured.

This polylactic acid composition exhibited a good appearance without bleeding out in a surface thereof or the like but was slightly clouded. The haze value thereof was 8.9%. In addition, the degree of crystallinity thereof measured by DSC was 62.4%. This sheet-shaped polylactic acid resin composition obtained a high degree of crystallinity but did not obtain sufficient transparency.

Comparative Example 6

100 parts by weight of a poly-L-lactic acid (Ingeo Biopolymer: 2500HP, manufactured by Nature Works, L-lactic acid purity >99 mol %), 4.7 parts by weight of polyethylene glycol (PEG-6000P, manufactured by Sanyo Chemical Industries Ltd.) as a plasticizer, and 0.53 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 200° C. to melt and soften the pellet, then discharged from a T-die, and cooled with a roll set at 32.5° C. to obtain a sheet having a thickness of 0.3 mm.

Furthermore, this sheet was allowed to stand for one day and one night in a thermostatic chamber at 45° C. to obtain a polylactic acid resin composition. The appearance, haze value, and degree of crystallinity of this polylactic acid composition were measured.

This polylactic acid composition exhibited a good appearance without bleeding out in a surface thereof or the like, had very high transparency and a haze value of 2.0%, but had a degree of crystallinity of 27.1% as measured by DSC, less than 50%. This sheet-shaped polylactic acid resin composition was immersed in a thermostatic oil bath, and a change with temperature was observed. As a result, the composition was deformed by its own weight by being heated to 60° C. Transparency was obtained, but sufficient heat resistance was not obtained.

Example 8

100 parts by weight of a poly-L-lactic acid (Ingeo Biopolymer: 2500HP, manufactured by Nature Works, L-lactic acid purity >99 mol %), 4.7 parts by weight of polyethylene glycol (PEG-6000P, manufactured by Sanyo Chemical Industries Ltd.) as a plasticizer, and 0.53 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 200° C. to melt and soften the pellet, then discharged from a T-die, and cooled with a roll set at 40° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 3.8%. In addition, the degree of crystallinity thereof measured by DSC was 54.4%. This sheet-shaped polylactic acid resin composition was immersed in a thermostatic oil bath, and a change with temperature was observed. As a result, deformation and the like were not observed even when the composition was heated to 130° C.

Comparative Example 7

100 parts by weight of a poly-L-lactic acid (Ingeo Biopolymer: 2500HP, manufactured by Nature Works, L-lactic acid purity >99 mol %), 4.7 parts by weight of polyethylene glycol (PEG-6000P, manufactured by Sanyo Chemical Industries Ltd.) as a plasticizer, and 0.53 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 200° C. to melt and soften the pellet, then discharged from a T-die, and cooled with a roll set at 53.7° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like but was slightly clouded. The haze value thereof was 7.2%. In addition, the degree of crystallinity thereof measured by DSC was 53.0%. This sheet-shaped polylactic acid resin composition obtained a high degree of crystallinity but did not obtain sufficient transparency.

Example 9

100 parts by weight of a poly-L-lactic acid (Ingeo Biopolymer: 2500HP, manufactured by Nature Works, L-lactic acid purity >99 mol %), 4.7 parts by weight of polyethylene glycol (PEG-6000P, manufactured by Sanyo Chemical Industries Ltd.) as a plasticizer, and 0.53 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 200° C. to melt and soften the pellet, then discharged from a T-die, and cooled with a roll set at 15° C. to obtain a sheet having a thickness of 0.3 mm.

Furthermore, this sheet was allowed to stand for one day and one night in a thermostatic chamber at 80° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 4.3%. In addition, the degree of crystallinity thereof measured by DSC was 57.8%. This sheet-shaped polylactic acid resin composition was immersed in a thermostatic oil bath, and a change with temperature was observed. As a result, deformation and the like were not observed even when the composition was heated to 130° C.

Example 10

100 parts by weight of a poly-L-lactic acid (Ingeo Biopolymer: 2500HP, manufactured by Nature Works, L-lactic acid purity >99 mol %), 4.7 parts by weight of polyethylene glycol (PEG-6000P, manufactured by Sanyo Chemical Industries Ltd.) as a plasticizer, and 1.5 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 200° C. to melt and soften the pellet, then discharged from a T-die, and cooled with a roll set at 15° C. to obtain a sheet having a thickness of 0.3 mm.

Furthermore, this sheet was allowed to stand for one day and one night in a thermostatic chamber at 55° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 4.5%. In addition, the degree of crystallinity thereof measured by DSC was 61.2%. This sheet-shaped polylactic acid resin composition was immersed in a thermostatic oil bath, and a change with temperature was observed. As a result, deformation and the like were not observed even when the composition was heated to 130° C.

Comparative Example 8

100 parts by weight of a poly-L-lactic acid (Ingeo Biopolymer: 2500HP, manufactured by Nature Works, L-lactic acid purity >99 mol %), 4.7 parts by weight of polyethylene glycol (PEG-6000P, manufactured by Sanyo Chemical Industries Ltd.) as a plasticizer, and 0.53 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 200° C. to melt and soften the pellet, then discharged from a T-die, and cooled with a roll set at 15° C. to obtain a sheet having a thickness of 0.3 mm.

Furthermore, this sheet was allowed to stand for one day and one night in a thermostatic chamber at 90° C. to obtain a polylactic acid resin composition. The appearance, haze value, and degree of crystallinity of this polylactic acid composition were measured.

This polylactic acid composition exhibited a good appearance without bleeding out in a surface thereof or the like but was clouded. The haze value thereof was 14.84%. In addition, the degree of crystallinity thereof measured by DSC was 59.5%. This sheet-shaped polylactic acid resin composition obtained a high degree of crystallinity but did not obtain sufficient transparency.

Example 11

A sheet-shaped polylactic acid resin composition was obtained under the same composition and conditions as in Example 1 except that 0.53 parts by weight of N-stearyl erucic acid amide (Nikka Amide SE, manufactured by Nippon Kasei Chemical Co., Ltd.) was used as a lubricant. This polylactic acid composition exhibited a good appearance without bleeding out in a surface thereof or the like and had very high transparency and a haze value of 2.4%. In addition, the degree of crystallinity thereof measured by DSC was 55.0%. This sheet-shaped polylactic acid resin composition was immersed in a thermostatic oil bath, and a change with temperature was observed. As a result, deformation and the like were not observed even when the composition was heated to 130° C.

Example 12

A sheet-shaped polylactic acid resin composition was obtained under the same composition and conditions as in Example 1 except that 0.53 parts by weight of N-stearyl stearic acid amide (Nikka Amide S, manufactured by Nippon Kasei Chemical Co., Ltd.) was used as a lubricant. This polylactic acid composition exhibited a good appearance without bleeding out in a surface thereof or the like and had very high transparency and a haze value of 2.2%. In addition, the degree of crystallinity thereof measured by DSC was 54.5%. This sheet-shaped polylactic acid resin composition was immersed in a thermostatic oil bath, and a change with temperature was observed. As a result, deformation and the like were not observed even when the composition was heated to 130° C.

Example 13

A sheet-shaped polylactic acid resin composition was obtained under the same composition and conditions as in Example 1 except that 5.2 parts by weight of a castor oil-based fatty acid ester (Rick sizer: C-101, manufactured by Itoh Oil Chemicals Co., Ltd.) was used as a plasticizer.

This polylactic acid composition exhibited a good appearance without bleeding out in a surface thereof or the like and had very high transparency and a haze value of 2.4%. In addition, the degree of crystallinity thereof measured by DSC was 61.2%. This sheet-shaped polylactic acid resin composition was immersed in a thermostatic oil bath, and a change with temperature was observed. As a result, deformation and the like were not observed even when the composition was heated to 130° C.

Example 14

A sheet-shaped polylactic acid resin composition was obtained under the same composition and conditions as in Example 1 except that 3 parts by weight of a castor oil-based fatty acid ester (Rick sizer: C-101, manufactured by Itoh Oil Chemicals Co., Ltd.) and 3 parts by weight of polyethylene glycol (PEG-6000P, manufactured by Sanyo Chemical Industries Ltd.) were used as a plasticizer. This polylactic acid composition exhibited a good appearance without bleeding out in a surface thereof or the like and had very high transparency and a haze value of 2.1%. In addition, the degree of crystallinity thereof measured by DSC was 60.2%. This sheet-shaped polylactic acid resin composition was immersed in a thermostatic oil bath, and a change with temperature was observed. As a result, deformation and the like were not observed even when the composition was heated to 130° C.

Example 15

100 parts by weight of a poly-L-lactic acid (Ingeo Biopolymer: 2500HP, manufactured by Nature Works, L-lactic acid purity >99 mol %), 4.0 parts by weight of polyethylene glycol (PEG-6000P, manufactured by Sanyo Chemical Industries Ltd.) as a plasticizer, and 1.0 part by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 200° C. to melt and soften the pellet, then discharged from a T-die, cooled with a roll set at 10° C., and further heated with a roll set at 65° C. to obtain a sheet-shaped polylactic acid resin composition having a thickness of 0.3 mm. The appearance, haze value, and degree of crystallinity of this polylactic acid composition were measured.

This polylactic acid composition exhibited a good appearance without bleeding out in a surface thereof or the like and had very high transparency and a haze value of 4.1%. In addition, the degree of crystallinity thereof measured by DSC was 57.8%. This sheet-shaped polylactic acid resin composition was immersed in a thermostatic oil bath, and a change with temperature was observed. As a result, deformation and the like were not observed even when the composition was heated to 130° C.

Example 16

100 parts by weight of a poly-L-lactic acid (Ingeo Biopolymer: 2500HP, manufactured by Nature Works, L-lactic acid purity >99 mol %), 4.0 parts by weight of polyethylene glycol (PEG-6000P, manufactured by Sanyo Chemical Industries Ltd.) as a plasticizer, 1.0 part by weight of ethylene bishydroxystearic acid amide (ITOHWAX: J-530, manufactured by Itoh Oil Chemicals Co., Ltd.) as a lubricant, and 3 parts by weight of a fatty acid glycerol ester (Wako Pure Chemical Industries, Ltd.) were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), the lubricant (C), and a glycerol fatty acid ester.

Subsequently, this pellet was fed to an extruder set at a cylinder temperature of 190° C. to melt and soften the pellet, then discharged from a T-die, cooled with a roll set at 10° C., and further heated with a roll set at 65° C. to obtain a sheet-shaped polylactic acid resin composition having a thickness of 0.3 mm. The appearance, haze value, and degree of crystallinity, and contact angle of this polylactic acid composition were measured.

This polylactic acid composition exhibited a good appearance without bleeding out in a surface thereof or the like and had very high transparency and a haze value of 4.1%. In addition, the degree of crystallinity thereof measured by DSC was 57.8%. This sheet-shaped polylactic acid resin composition was immersed in a thermostatic oil bath, and a change with temperature was observed. As a result, deformation and the like were not observed even when the composition was heated to 130° C.

In addition, the contact angle of pure water on a surface of this sheet was 50° as measured by a θ/2 method. The contact angle of pure water of a sheet formed of a poly-L-lactic acid alone was 78°. Therefore, the surface was improved so as to have hydrophilicity due to this composition, and an effect such as antifogging was improved.

Example 17

100 parts by weight of a poly-L-lactic acid (Ingeo Biopolymer: 3100HP, manufactured by Nature Works, L-lactic acid purity >99 mol %), 4.0 parts by weight of polyethylene glycol (PEG-6000P, manufactured by Sanyo Chemical Industries Ltd.) as a plasticizer, and 0.8 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was formed into a flat plate-shaped molded article having a thickness of 3 mm using an injection molding machine in which a cylinder temperature was set to 170 to 180° C. and a die temperature was set to 20° C.

Furthermore, this molded article was allowed to stand for one day and one night in a thermostatic chamber at 55° C. to obtain a flat plate-shaped polylactic acid resin composition. The appearance, haze value, and degree of crystallinity of this polylactic acid composition were measured.

This polylactic acid composition exhibited a good appearance without bleeding out in a surface thereof or the like and was transparent. The haze value thereof in terms of 0.3 mm was 4.5%. In addition, the degree of crystallinity thereof measured by DSC was 59.8%. This polylactic acid resin composition was immersed in a thermostatic oil bath, and a change with temperature was observed. As a result, deformation and the like were not observed even when the composition was heated to 130° C.

Example 18

100 parts by weight of a poly-L-lactic acid (Ingeo Biopolymer: 4032D, manufactured by Nature Works, L-lactic acid purity: 98 to 99 mol %), 4.7 parts by weight of polyethylene glycol (PEG-6000P, manufactured by Sanyo Chemical Industries Ltd.) as a plasticizer, and 0.53 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 98 to 99 mol %, the plasticizer (B), and the lubricant (C).

Subsequently, this pellet was fed to an extruder set at a cylinder temperature of 200° C. to melt and soften the pellet, then discharged from a T-die, and cooled with a roll set at 25° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 2.8%. In addition, the degree of crystallinity thereof measured by DSC was 40.5%. This sheet-shaped polylactic acid resin composition was immersed in a thermostatic oil bath, and a change with temperature was observed. As a result, deformation and the like were not observed even when the composition was heated to 120° C.

Example 19

100 parts by weight of a poly-L-lactic acid (Ingeo Biopolymer: 4032D, manufactured by Nature Works, L-lactic acid purity: 98 to 99 mol %), 10 parts by weight of polyethylene glycol (PEG-6000P, manufactured by Sanyo Chemical Industries Ltd.) as a plasticizer, and 0.53 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 150 to 180° C. to obtain a pellet-shaped mixture containing the poly-L-lactic acid (A) having an L-lactic acid purity of 98 to 99 mol %, the plasticizer (B), and the lubricant (C).

Subsequently, this pellet was fed to an extruder set at a cylinder temperature of 190° C. to melt and soften the pellet, then discharged from a T-die, and cooled with a roll set at 25° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 3.6%. In addition, the degree of crystallinity thereof measured by DSC was 39.7%. This sheet-shaped polylactic acid resin composition was immersed in a thermostatic oil bath, and a change with temperature was observed. As a result, deformation and the like were not observed even when the composition was heated to 120° C.

Example 20

100 parts by weight of a poly-L-lactic acid (Ingeo Biopolymer: 4032D, manufactured by Nature Works, L-lactic acid purity: 98 to 99 mol %), 3 parts by weight of polyethylene glycol (PEG-6000P, manufactured by Sanyo Chemical Industries Ltd.) as a plasticizer, and 0.53 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 98 to 99 mol %, the plasticizer (B), and the lubricant (C).

Subsequently, this pellet was fed to an extruder set at a cylinder temperature of 200° C. to melt and soften the pellet, then discharged from a T-die, and cooled with a roll set at 25° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 2.1%. In addition, the degree of crystallinity thereof measured by DSC was 38.7%. This sheet-shaped polylactic acid resin composition was immersed in a thermostatic oil bath, and a change with temperature was observed. As a result, deformation and the like were not observed even when the composition was heated to 120° C.

Example 21

100 parts by weight of a poly-L-lactic acid (Ingeo Biopolymer: 4032D, manufactured by Nature Works, L-lactic acid purity: 98 to 99 mol %), 4.7 parts by weight of polyethylene glycol (PEG-6000P, manufactured by Sanyo Chemical Industries Ltd.) as a plasticizer, and 0.3 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 98 to 99 mol %, the plasticizer (B), and the lubricant (C).

Subsequently, this pellet was fed to an extruder set at a cylinder temperature of 200° C. to melt and soften the pellet, then discharged from a T-die, and cooled with a roll set at 32.5° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 2.1%. In addition, the degree of crystallinity thereof measured by DSC was 35.8%. This sheet-shaped polylactic acid resin composition was immersed in a thermostatic oil bath, and a change with temperature was observed. As a result, deformation and the like were not observed even when the composition was heated to 120° C.

Example 22

100 parts by weight of a poly-L-lactic acid (Ingeo Biopolymer: 4032D, manufactured by Nature Works, L-lactic acid purity: 98 to 99 mol %), 4.7 parts by weight of polyethylene glycol (PEG-6000P, manufactured by Sanyo Chemical Industries Ltd.) as a plasticizer, and 1.0 part by weight of ethylene bishydroxystearic acid amide (ITOH-WAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 98 to 99 mol %, the plasticizer (B), and the lubricant (C).

Subsequently, this pellet was fed to an extruder set at a cylinder temperature of 200° C. to melt and soften the pellet, then discharged from a T-die, and cooled with a roll set at 25° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 4.0%. In addition, the degree of crystallinity thereof measured by DSC was 49.9%. This sheet-shaped polylactic acid resin composition was immersed in a thermostatic oil bath, and a change with temperature was observed. As a result, deformation and the like were not observed even when the composition was heated to 120° C.

Example 23

100 parts by weight of a poly-L-lactic acid (Ingeo Biopolymer: 4032D, manufactured by Nature Works, L-lactic acid purity: 98 to 99 mol %), 4.7 parts by weight of polyethylene glycol (PEG-6000P, manufactured by Sanyo Chemical Industries Ltd.) as a plasticizer, and 0.53 parts by weight of ethylene bishydroxystearic acid amide (ITOH-WAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 98 to 99 mol %, the plasticizer (B), and the lubricant (C).

Subsequently, this pellet was fed to an extruder set at a cylinder temperature of 200° C. to melt and soften the pellet, then discharged from a T-die, and cooled with a roll set at 25° C. to obtain a sheet having a thickness of 0.3 mm.

Furthermore, this sheet was allowed to stand for one day and one night in a thermostatic chamber at 60° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 4.3%. In addition, the degree of crystallinity thereof measured by DSC was 45.0%. This sheet-shaped polylactic acid resin composition was immersed in a thermostatic oil bath, and a change with temperature was observed. As a result, deformation and the like were not observed even when the composition was heated to 120° C.

Example 24

100 parts by weight of a poly-L-lactic acid (Ingeo Biopolymer: 4032D, manufactured by Nature Works, L-lactic acid purity: 98 to 99 mol %), 4.7 parts by weight of polyethylene glycol (PEG-6000P, manufactured by Sanyo Chemical Industries Ltd.) as a plasticizer, and 0.53 parts by weight of ethylene bishydroxystearic acid amide (ITOH-WAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 98 to 99 mol %, the plasticizer (B), and the lubricant (C).

Subsequently, this pellet was fed to an extruder set at a cylinder temperature of 200° C. to melt and soften the pellet, then discharged from a T-die, and cooled with a roll set at 40° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 4.6%. In addition, the degree of crystallinity thereof measured by DSC was 37.6%. This sheet-shaped polylactic acid resin composition was immersed in a thermostatic oil bath, and a change with temperature was observed. As a result, deformation and the like were not observed even when the composition was heated to 120° C.

Example 25

100 parts by weight of a poly-L-lactic acid (Ingeo Biopolymer: 4032D, manufactured by Nature Works, L-lactic acid purity: 98 to 99 mol %), 4.7 parts by weight of polyethylene glycol (PEG-6000P, manufactured by Sanyo Chemical Industries Ltd.) as a plasticizer, and 0.53 parts by weight of ethylene bishydroxystearic acid amide (ITOH-WAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 98 to 99 mol %, the plasticizer (B), and the lubricant (C).

Subsequently, this pellet was fed to an extruder set at a cylinder temperature of 200° C. to melt and soften the pellet, then discharged from a T-die, and cooled with a roll set at 15° C. to obtain a sheet having a thickness of 0.3 mm.

Furthermore, this sheet was allowed to stand for one day and one night in a thermostatic chamber at 80° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 4.7%. In addition, the degree of crystallinity thereof measured by DSC was 54.4%. This sheet-shaped polylactic acid resin composition was immersed in a thermostatic oil bath, and a change with temperature was observed. As a result, deformation and the like were not observed even when the composition was heated to 130° C.

Example 26

100 parts by weight of a poly-L-lactic acid (Ingeo Biopolymer: 4032D, manufactured by Nature Works, L-lactic acid purity: 98 to 99 mol %), 4.7 parts by weight of polyethylene glycol (PEG-6000P, manufactured by Sanyo Chemical Industries Ltd.) as a plasticizer, and 1.5 parts by weight of ethylene bishydroxystearic acid amide (ITOH-WAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 98 to 99 mol %, the plasticizer (B), and the lubricant (C).

Subsequently, this pellet was fed to an extruder set at a cylinder temperature of 200° C. to melt and soften the pellet, then discharged from a T-die, and cooled with a roll set at 15° C. to obtain a sheet having a thickness of 0.3 mm.

Furthermore, this sheet was allowed to stand for one day and one night in a thermostatic chamber at 55° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 4.1%. In addition, the degree of crystallinity thereof measured by DSC was 50.2%. This sheet-shaped polylactic acid resin composition was immersed in a thermostatic oil bath, and a change with temperature was observed. As a result, deformation and the like were not observed even when the composition was heated to 130° C.

Example 27

100 parts by weight of a poly-L-lactic acid (Ingeo Biopolymer: 2500HP, manufactured by Nature Works, L-lactic acid purity >99 mol %), 56 parts by weight of polyethylene glycol (PEG-6000P, manufactured by Sanyo Chemical Industries Ltd.) as a plasticizer, and 10.7 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped concentrated polylactic acid resin composition (D) containing 66.7 parts by weight of the plasticizer (B) and the lubricant (C) in total with respect to 100 parts by weight of the poly-L-lactic acid (A).

Subsequently, 87.5 parts by weight of a poly-L-lactic acid (Ingeo Biopolymer: 2500HP, manufactured by Nature Works, L-lactic acid purity >99 mol %) was dry mixed with 12.5 parts by weight of the polylactic acid resin composition (D). The resulting mixture was fed to an extruder set at a cylinder temperature of 200° C. to melt and soften the mixture. Thereafter, the resulting product was discharged from a T-die and cooled with a roll set at 32.5° C. to obtain a sheet having a thickness of 0.3 mm.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 2.6%. In addition, the degree of crystallinity thereof measured by DSC was 52.2%. This sheet-shaped polylactic acid resin composition was immersed in a thermostatic oil bath, and a change with temperature was observed. As a result, deformation and the like were not observed even when the composition was heated to 130° C.

Example 28

60 parts by weight of a poly-L-lactic acid (Ingeo Biopolymer: 2500HP, manufactured by Nature Works, L-lactic acid purity >99 mol %), 40 parts by weight of a poly-L-lactic acid (Ingeo Biopolymer: 2003D, manufactured by Nature Works, L-lactic acid purity <98 mol %), 84 parts by weight of polyethylene glycol (PEG-6000P, manufactured by Sanyo Chemical Industries Ltd.) as a plasticizer, and 16 parts by weight of ethylene bishydroxystearic acid amide (ITOH-WAX: J-530, manufactured by Itoh Oil Chemicals Co., Ltd.) as a lubricant were kneaded with a twin-screw extruding kneader at a cylinder temperature of 160 to 180° C. to obtain a pellet-shaped concentrated polylactic acid resin composition (D) containing 100 parts by weight of the plasticizer (B) and the lubricant (C) in total with respect to 100 parts by weight of the poly-L-lactic acid (A) containing a poly-L-lactic acid having an L-lactic acid purity of less than 98 mol %.

Subsequently, 90 parts by weight of a poly-L-lactic acid (Ingeo Biopolymer: 2500HP, manufactured by Nature Works, L-lactic acid purity >99 mol %) was dry mixed with 10 parts by weight of the polylactic acid resin composition (D). The resulting mixture was fed to an extruder set at a cylinder temperature of 200° C. to melt and soften the mixture. Thereafter, the resulting product was discharged from a T-die, cooled with a roll set at 10° C., and further heated with a roll set at 65° C. to obtain a sheet-shaped polylactic acid resin composition having a thickness of 0.3 mm. The appearance, haze value, and degree of crystallinity of this polylactic acid composition were measured.

This polylactic acid composition exhibited a good appearance without bleeding out in a surface thereof or the like and had very high transparency and a haze value of 4.5%. In addition, the degree of crystallinity thereof measured by DSC was 59.9%. This sheet-shaped polylactic acid resin composition was immersed in a thermostatic oil bath, and a change with temperature was observed. As a result, deformation and the like were not observed even when the composition was heated to 130° C.

Example 29

The sheet-shaped polylactic acid resin composition obtained in Example 1 was subjected to vacuum pressure molding. Incidentally, as vacuum pressure molding conditions, the polylactic acid resin composition was heated so as to have a temperature of 140° C. to be softened and then molded with a die left at room temperature to obtain a container-shaped polylactic acid resin molded article. This polylactic acid resin molded article exhibited a good appearance and good moldability without bleeding out in a surface thereof or the like and had very high transparency and a haze value of 4.3%. In addition, the degree of crystallinity thereof measured by DSC was 55.6%. Water was put in this container-shaped polylactic acid resin molded article, and the molded article was heated with a microwave oven set at 1,500 W for two minutes. As a result, there was no change in shape of the container due to heating, but the container was slightly deformed to undulate only at a bottom of the container.

Example 30

The sheet-shaped polylactic acid resin composition obtained in Example 1 was subjected to vacuum pressure molding. Incidentally, as vacuum pressure molding conditions, the polylactic acid resin composition was heated so as to have a temperature of 150° C. to be softened and then molded with a die heated to 60° C. to obtain a container-shaped polylactic acid resin molded article. This polylactic acid resin molded article exhibited a good appearance and good moldability without bleeding out in a surface thereof or the like and had very high transparency and a haze value of 4.5%. In addition, the degree of crystallinity thereof measured by DSC was 57.9%. Water was put in this container-shaped polylactic acid resin molded article, and the molded article was heated with a microwave oven set at 1,500 W for two minutes. As a result, a change in shape of the container or deformation did not occur due to heating.

Example 31

100 parts by weight of a poly-L-lactic acid (Ingeo Biopolymer: 2500HP, manufactured by Nature Works, L-lactic acid purity >99 mol %), 2.68 parts by weight of a castor oil-based fatty acid ester (Rick sizer: C-101, manufactured by Itoh Oil Chemicals Co., Ltd.) as a plasticizer, and 0.41 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 99 mol % or more, the plasticizer (B), and the lubricant (C).

Subsequently, this pellet was fed to an extruder set at a cylinder temperature of 200° C. to melt and soften the pellet, then discharged from a T-die, and cooled with a roll set at 20° C. to obtain a sheet having a thickness of 0.3 mm.

This sheet was subjected to differential scanning calorimetry at a heating rate of 10° C. per minute. As a result, the cold crystallization heat generation amount of the poly-L-lactic acid was 20.0 J/g.

Furthermore, this sheet was heated in a thermostatic chamber at 47° C. for 15 hours to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 2.5%. In addition, the degree of crystallinity thereof measured by DSC was 52.6%. This sheet-shaped polylactic acid resin composition was immersed in a thermostatic oil bath, and a change with temperature was observed. As a result, deformation and the like were not observed even when the composition was heated to 130° C.

In addition, this sheet was subjected to differential scanning calorimetry at a heating rate of 10° C. per minute. As a result, the cold crystallization heat generation amount of the poly-L-lactic acid was 2.0 J/g.

Example 32

100 parts by weight of a poly-L-lactic acid (Ingeo Biopolymer: 4032D, manufactured by Nature Works, L-lactic acid purity: 98 to 99 mol %), 3.54 parts by weight of a castor oil-based fatty acid ester (Rick sizer: C-101, manufactured by Itoh Oil Chemicals Co., Ltd.) and 0.21 parts by weight of polyethylene glycol (PEG-6000P, manufactured by Sanyo Chemical Industries Ltd.) as a plasticizer, and 0.42 parts by weight of ethylene bishydroxystearic acid amide (ITOHWAX: J-530, manufactured by Itoh Oil Chemicals Co., Ltd.) as a lubricant were kneaded with a twin-screw extruding kneader at a cylinder temperature of 160 to 180° C. to obtain a pellet-shaped mixture containing the poly-L-lactic acid (A) having an L-lactic acid purity of 98 to 99 mol %, the plasticizer (B), and the lubricant (C).

Subsequently, this pellet was fed to an extruder set at a cylinder temperature of 200° C. to melt and soften the pellet, then discharged from a T-die, and cooled with a roll set at 25° C. to obtain a sheet having a thickness of 0.3 mm.

This sheet was subjected to differential scanning calorimetry at a heating rate of 10° C. per minute. As a result, the cold crystallization heat generation amount of the poly-L-lactic acid was 21.6 J/g.

Furthermore, this sheet was allowed to stand for one day and one night in a thermostatic chamber at 50° C. to obtain a polylactic acid resin composition. The appearance, haze value, and degree of crystallinity of this polylactic acid composition were measured.

This polylactic acid composition exhibited a good appearance without bleeding out in a surface thereof or the like and had very high transparency and a haze value of 2.8%. In addition, the degree of crystallinity thereof measured by DSC was 40.5%. This sheet-shaped polylactic acid resin composition was immersed in a thermostatic oil bath, and a change with temperature was observed. As a result, deformation and the like were not observed even when the composition was heated to 120° C.

In addition, this sheet was subjected to differential scanning calorimetry at a heating rate of 10° C. per minute. As a result, the cold crystallization heat generation amount of the poly-L-lactic acid was 0.4 J/g.

TABLE 1

| | POLY-L-LACTIC ACID (A) | | | PLASTICIZER (B) | | LUBRICANT (c) | |
|---|---|---|---|---|---|---|---|
| | PURITY | (Ingeo Biopolymer) | PARTS BY WEIGHT | | PARTS BY WEIGHT | | PARTS BY WEIGHT |
| EXAMPLE 1 | >99 mol % | 2500HP | 100 | PEG-6000G | 4.7 | ITOHWAX: J-530 | 0.53 |
| EXAMPLE 2 | >99 mol % | 2500HP | 100 | PEG-6000G | 10.0 | ITOHWAX: J-530 | 0.53 |
| EXAMPLE 3 | >99 mol % | 2500HP | 100 | PEG-6000G | 3.0 | ITOHWAX: J-530 | 0.53 |
| COMPARATIVE EXAMPLE 1 | >99 mol % | 2500HP | 100 | PEG-6000G | 12.0 | ITOHWAX: J-530 | 0.53 |

TABLE 1-continued

| | POLY-L-LACTIC ACID (A) | | | PLASTICIZER (B) | | LUBRICANT (c) | |
|---|---|---|---|---|---|---|---|
| | PURITY | (Ingeo Biopolymer) | PARTS BY WEIGHT | | PARTS BY WEIGHT | | PARTS BY WEIGHT |
| COMPARATIVE EXAMPLE 2 | >99 mol % | 2500HP | 100 | PEG-6000G | 2.5 | ITOHWAX: J-530 | 0.53 |
| EXAMPLE 4 | >99 mol % | 2500HP | 100 | PEG-6000G | 4.7 | ITOHWAX: J-530 | 0.30 |
| EXAMPLE 5 | >99 mol % | 2500HP | 100 | PEG-6000G | 4.7 | ITOHWAX: J-530 | 1.00 |
| COMPARATIVE EXAMPLE 3 | >99 mol % | 2500HP | 100 | PEG-6000G | 4.7 | ITOHWAX: J-530 | 0.20 |
| COMPARATIVE EXAMPLE 4 | >99 mol % | 2500HP | 100 | PEG-6000G | 4.7 | ITOHWAX: J-530 | 1.20 |
| EXAMPLE 6 | >99 mol % | 2500HP | 100 | PEG-6000G | 4.7 | ITOHWAX: J-530 | 0.53 |
| EXAMPLE 7 | >99 mol % | 2500HP | 100 | PEG-6000G | 4.7 | ITOHWAX: J-530 | 0.53 |
| COMPARATIVE EXAMPLE 5 | >99 mol % | 2500HP | 100 | PEG-6000G | 4.7 | ITOHWAX: J-530 | 0.53 |
| COMPARATIVE EXAMPLE 6 | >99 mol % | 2500HP | 100 | PEG-6000G | 4.7 | ITOHWAX: J-530 | 0.53 |
| EXAMPLE 8 | >99 mol % | 2500HP | 100 | PEG-6000G | 4.7 | ITOHWAX: J-530 | 0.53 |
| COMPARATIVE EXAMPLE 7 | >99 mol % | 2500HP | 100 | PEG-6000G | 4.7 | ITOHWAX: J-530 | 0.53 |
| EXAMPLE 9 | >99 mol % | 2500HP | 100 | PEG-6000G | 4.7 | ITOHWAX: J-530 | 0.53 |
| EXAMPLE 10 | >99 mol % | 2500HP | 100 | PEG-6000G | 4.7 | ITOHWAX: J-530 | 1.50 |
| COMPARATIVE EXAMPLE 8 | >99 mol % | 2500HP | 100 | PEG-6000G | 4.7 | ITOHWAX: J-530 | 0.53 |
| EXAMPLE 11 | >99 mol % | 2500HP | 100 | PEG-6000G | 4.7 | NIKKA AMIDESE | 0.53 |
| EXAMPLE 12 | >99 mol % | 2500HP | 100 | PEG-6000G | 4.7 | NIKKA AMIDES | 0.53 |
| EXAMPLE 13 | >99 mol % | 2500HP | 100 | RICK SIZER: C-101 | 5.2 | ITOHWAX: J-530 | 0.53 |
| EXAMPLE 14 | >99 mol % | 2500HP | 100 | RICK SIZER: C-101 PEG-6000G | 3.0 3.0 | ITOHWAX: J-530 | 0.53 |
| EXAMPLE 15 | >99 mol % | 2500HP | 100 | PEG-6000G | 4.0 | ITOHWAX: J-530 | 1.00 |
| EXAMPLE 16 | >99 mol % | 2500HP | 100 | PEG-6000G | 4.0 | ITOHWAX: J-530 FATTY ACID GLYCEROL ESTER | 1.00 3.00 |
| EXAMPLE 17 | >99 mol % | 3100HP | 100 | PEG-6000G | 4.0 | ITOHWAX: J-530 | 0.80 |
| EXAMPLE 18 | 98-99 mol % | 4032D | 100 | PEG-6000G | 4.7 | ITOHWAX: J-530 | 0.53 |
| EXAMPLE 19 | 98-99 mol % | 4032D | 100 | PEG-6000G | 10.0 | ITOHWAX: J-530 | 0.53 |
| EXAMPLE 20 | 98-99 mol % | 4032D | 100 | PEG-6000G | 3.0 | ITOHWAX: J-530 | 0.53 |
| EXAMPLE 21 | 98-99 mol % | 4032D | 100 | PEG-6000G | 4.7 | ITOHWAX: J-530 | 0.30 |
| EXAMPLE 22 | 98-99 mol % | 4032D | 100 | PEG-6000G | 4.7 | ITOHWAX: J-530 | 1.00 |
| EXAMPLE 23 | 98-99 mol % | 4032D | 100 | PEG-6000G | 4.7 | ITOHWAX: J-530 | 0.53 |
| EXAMPLE 24 | 98-99 mol % | 4032D | 100 | PEG-6000G | 4.7 | ITOHWAX: J-530 | 0.53 |
| EXAMPLE 25 | 98-99 mol % | 4032D | 100 | PEG-6000G | 4.7 | ITOHWAX: J-530 | 0.53 |
| EXAMPLE 26 | 98-99 mol % | 4032D | 100 | PEG-6000G | 4.7 | ITOHWAX: J-530 | 1.50 |
| EXAMPLE 27 | >99 mol % >99 mol % | 2500HP(A) 2500HP | 100 87.5 | PEG-6000G(B) (D) = (A) + (B) + (C) | 56.0 12.5 | ITOHWAX: J-530(C) | 10.70 |
| EXAMPLE 28 | >99 mol % <98 mol % >99 mol % | 2500HP(A) 2003D(A) 2500HP | 60 40 90 | PEG-6000G(B) (D) = (A) + (B) + (C) | 84.0 10.0 | ITOHWAX: J-530(C) | 16.00 |
| EXAMPLE 31 | >99 mol % | 2500HP | 100 | RICK SIZER: C-101 | 2.68 | ITOHWAX: J-530 | 0.41 |
| EXAMPLE 32 | 98-99 mol % | 4032D | 100 | RICK SIZER: C-101 PEG-6000G | 3.54 0.21 | ITOHWAX: J-530 | 0.42 |

TABLE 2

| | CYLINDER TEMPERATURE [° C.] | | DIE TEMPERATURE [° C.] | COOLING TEMPERATURE [° C.] | HEATING TEMPERATURE [° C.] | THERMO-STATIC CHAMBER [° C.] | HAZE VALUE [%] | DEGREE OF CRYSTAL-LINITY [%] | HEATING COMPO-SITION (HEATING TO 130° C.) | CONTACT ANGLE [°] |
|---|---|---|---|---|---|---|---|---|---|---|
| | KNEAD-ING | MELTING AND SOFTENING | | | | | | | | |
| EXAMPLE 1 | 160-180 | 200 | — | 32.5 | — | 50 | 2.5 | 52.6 | NOT DEFORMED | — |
| EXAMPLE 2 | 150-180 | 190 | — | 32.5 | — | 50 | 2.8 | 51.5 | NOT DEFORMED | — |
| EXAMPLE 3 | 160-180 | 200 | — | 32.5 | — | 50 | 2.2 | 55.0 | NOT DEFORMED | — |
| COMPARATIVE EXAMPLE 1 | 150-180 | 165 | — | 32.5 | — | 50 | 2.9 | 41.1 | DEFORMED (HEATING TO 80° C.) | — |

TABLE 2-continued

| | CYLINDER TEMPERATURE [° C.] | | DIE TEMPERATURE [° C.] | COOLING TEMPERATURE [° C.] | HEATING TEMPERATURE [° C.] | THERMOSTATIC CHAMBER [° C.] | HAZE VALUE [%] | DEGREE OF CRYSTALLINITY [%] | HEATING COMPOSITION (HEATING TO 130° C.) | CONTACT ANGLE [°] |
|---|---|---|---|---|---|---|---|---|---|---|
| | KNEADING | MELTING AND SOFTENING | | | | | | | | |
| COMPARATIVE EXAMPLE 2 | 150-180 | 210 | — | 32.5 | — | 50 | 2.1 | 35.8 | DEFORMED (HEATING TO 70° C.) | — |
| EXAMPLE 4 | 160-180 | 200 | — | 32.5 | — | 50 | 2.1 | 51.2 | NOT DEFORMED | — |
| EXAMPLE 5 | 160-180 | 200 | — | 32.5 | — | 50 | 4.3 | 60.4 | NOT DEFORMED | — |
| COMPARATIVE EXAMPLE 3 | 160-180 | 200 | — | 32.5 | — | 50 | 7.8 | 30.1 | DEFORMED (HEATING TO 70° C.) | — |
| COMPARATIVE EXAMPLE 4 | 160-180 | 200 | — | 32.5 | — | 50 | 6.3 | 58.0 | — | — |
| EXAMPLE 6 | 160-180 | 200 | — | 32.5 | — | 60 | 2.6 | 55.2 | NOT DEFORMED | — |
| EXAMPLE 7 | 160-180 | 200 | — | 32.5 | — | 70 | 4.1 | 61.4 | NOT DEFORMED | — |
| COMPARATIVE EXAMPLE 5 | 160-180 | 200 | — | 32.5 | — | 80 | 8.9 | 62.4 | — | — |
| COMPARATIVE EXAMPLE 6 | 160-180 | 200 | — | 32.5 | — | 45 | 2.0 | 27.1 | DEFORMED (HEATING TO 60° C.) | — |
| EXAMPLE 8 | 160-180 | 200 | — | 40.0 | — | 50 | 3.8 | 54.4 | NOT DEFORMED | — |
| COMPARATIVE EXAMPLE 7 | 160-180 | 200 | — | 53.7 | — | 50 | 7.2 | 53.0 | — | — |
| EXAMPLE 9 | 160-180 | 200 | — | 15.0 | — | 80 | 4.3 | 57.8 | NOT DEFORMED | — |
| EXAMPLE 10 | 160-180 | 200 | — | 15.0 | — | 55 | 4.5 | 61.2 | NOT DEFORMED | — |
| COMPARATIVE EXAMPLE 8 | 160-180 | 200 | — | 15.0 | — | 90 | 14.84 | 59.5 | — | — |
| EXAMPLE 11 | 160-180 | 200 | — | 32.5 | — | 50 | 2.4 | 55.0 | NOT DEFORMED | — |
| EXAMPLE 12 | 160-180 | 200 | — | 32.5 | — | 50 | 2.2 | 54.5 | NOT DEFORMED | — |
| EXAMPLE 13 | 160-180 | 200 | — | 32.5 | — | 50 | 2.4 | 61.2 | NOT DEFORMED | — |
| EXAMPLE 14 | 160-180 | 200 | — | 32.5 | — | 50 | 2.1 | 60.2 | NOT DEFORMED | — |
| EXAMPLE 15 | 160-180 | 200 | — | 10.0 | 65 | — | 4.1 | 57.8 | NOT DEFORMED | — |
| EXAMPLE 16 | 160-180 | 190 | — | 10.0 | 65 | — | 4.1 | 57.8 | NOT DEFORMED | 50 |
| EXAMPLE 17 | 160-180 | 170-180 | 20 | — | — | 55 | 4.5 | 59.8 | NOT DEFORMED | — |
| EXAMPLE 18 | 160-180 | 200 | — | 25.0 | — | 50 | 2.8 | 40.5 | NOT DEFORMED (HEATING TO 120° C.) | — |
| EXAMPLE 19 | 150-180 | 190 | — | 25.0 | — | 50 | 3.6 | 39.7 | NOT DEFORMED (HEATING TO 120° C.) | — |
| EXAMPLE 20 | 160-180 | 200 | — | 25.0 | — | 50 | 2.1 | 38.7 | NOT DEFORMED (HEATING TO 120° C.) | — |
| EXAMPLE 21 | 160-180 | 200 | — | 32.5 | — | 50 | 2.1 | 35.8 | NOT DEFORMED (HEATING TO 120° C.) | — |
| EXAMPLE 22 | 160-180 | 200 | — | 25.0 | — | 50 | 4.0 | 49.9 | NOT DEFORMED (HEATING TO 120° C.) | — |

TABLE 2-continued

| | CYLINDER TEMPERATURE [° C.] | | DIE TEMPER-ATURE [° C.] | COOLING TEMPER-ATURE [° C.] | HEATING TEMPER-ATURE [° C.] | THERMO-STATIC CHAMBER [° C.] | HAZE VALUE [%] | DEGREE OF CRYSTAL-LINITY [%] | HEATING COMPO-SITION (HEATING TO 130° C.) | CONTACT ANGLE [°] |
|---|---|---|---|---|---|---|---|---|---|---|
| | KNEAD-ING | MELTING AND SOFTENING | | | | | | | | |
| EXAMPLE 23 | 160-180 | 200 | — | 25.0 | — | 60 | 4.3 | 45.0 | NOT DEFORMED (HEATING TO 120° C.) | — |
| EXAMPLE 24 | 160-180 | 200 | — | 40.0 | — | 50 | 4.6 | 37.6 | NOT DEFORMED (HEATING TO 120° C.) | — |
| EXAMPLE 25 | 160-180 | 200 | — | 15.0 | — | 80 | 4.7 | 54.4 | NOT DEFORMED | — |
| EXAMPLE 26 | 160-180 | 200 | — | 15.0 | — | 55 | 4.1 | 50.2 | NOT DEFORMED | — |
| EXAMPLE 27 | 160-180 | 200 | — | 32.5 | — | 50 | 2.6 | 52.2 | NOT DEFORMED | — |
| EXAMPLE 28 | 160-180 | 200 | — | 10.0 | 65 | — | 4.5 | 59.9 | NOT DEFORMED | — |
| EXAMPLE 31 | 160-180 | 200 | — | 20.0 | — | 47 | 2.5 | 52.6 | NOT DEFORMED | — |
| EXAMPLE 32 | 160-180 | 200 | — | 26.0 | — | 50 | 2.8 | 40.5 | NOT DEFORMED (HEATING TO 120° C.) | — |

Method for Manufacturing Polylactic Acid Resin Composition (1) One aspect of a method for manufacturing the polylactic acid resin composition according to the present embodiment includes: a melting step of melting a mixture containing 100 parts by weight of the poly-L-lactic acid (A) having an L-lactic acid purity of 99 mol % or more, 2.6 to 10 parts by weight of the plasticizer (B), and 0.3 to 1.0 part by weight of the lubricant (C); a cooling step of cooling the mixture to 20 to 40° C. after the melting step; and a heating step of heating the mixture to 46 to 70° C. after the cooling step. In addition, the obtained polylactic acid resin composition satisfies the following conditions (a) and (b).

(a) A haze value at a thickness of 0.3 mm is 5% or less.

(b) The degree of crystallinity measured by a differential scanning calorimeter is 50 to 70%.

(2) In addition, another aspect of the method for manufacturing the polylactic acid resin composition includes: a melting step of melting a mixture containing 100 parts by weight of the poly-L-lactic acid (A) having an L-lactic acid purity of 99 mol % or more, 2.6 to 10 parts by weight of the plasticizer (B), and 0.3 to 1.5 parts by weight of the lubricant (C); a cooling step of cooling the mixture to lower than 20° C. after the melting step; and a heating step of heating the mixture to 46 to 80° C. after the cooling step. In addition, the obtained polylactic acid resin composition satisfies the following conditions (c) and (d).

(c) A haze value at a thickness of 0.3 mm is 5% or less.

(d) The degree of crystallinity measured by a differential scanning calorimeter is 50 to 70%.

(3) Another aspect of the method for manufacturing the polylactic acid resin composition includes: a melting step of melting a mixture containing 100 parts by weight of the poly-L-lactic acid (A) having an L-lactic acid purity of 98 to 99 mol %, 2.6 to 10 parts by weight of the plasticizer (B), and 0.3 to 1.0 part by weight of the lubricant (C); a cooling step of cooling the mixture to 20 to 40° C. after the melting step; and a heating step of heating the mixture to 46 to 60° C. after the cooling step. The obtained polylactic acid resin composition satisfies the following conditions (e) and (f).

(e) A haze value at a thickness of 0.3 mm is 5% or less.

(f) The degree of crystallinity measured by a differential scanning calorimeter is 35 to 55%.

(4) Another aspect of the method for manufacturing the polylactic acid resin composition includes: a melting step of melting a mixture containing 100 parts by weight of the poly-L-lactic acid (A) having an L-lactic acid purity of 98 to 99 mol %, 2.6 to 10 parts by weight of the plasticizer (B), and 0.3 to 1.5 parts by weight of the lubricant (C); a cooling step of cooling the mixture to lower than 20° C. after the melting step; and a heating step of heating the mixture to 46 to 80° C. after the cooling step. The obtained polylactic acid resin composition satisfies the following conditions (g) and (h).

(g) A haze value at a thickness of 0.3 mm is 5% or less.

(h) The degree of crystallinity measured by a differential scanning calorimeter is 35 to 55%.

In addition, the above method for manufacturing the polylactic acid resin composition may further include a step of previously manufacturing the concentrated polylactic acid resin composition (D) obtained by kneading 25 to 100 parts by weight of the plasticizer (B) and the lubricant (C) in total with respect to 100 parts by weight of the poly-L-lactic acid (A) in order to manufacture a mixture containing the poly-L-lactic acid (A), the plasticizer (B), and the lubricant (C). Here, the concentrated polylactic acid resin composition (D) may further contain a poly-L-lactic acid having an L-lactic acid purity of less than 98 mol %. Method for manufacturing polylactic acid resin molded article (1) As a method for manufacturing the polylactic acid resin molded article according to the present embodiment, the polylactic acid resin composition obtained by the above manufacturing method is further heated to 130 to 160° C. to soften the composition, and then molded and cooled in a die. Here, the temperature of the die may be 30 to 60° C.

INDUSTRIAL APPLICABILITY

The polylactic acid resin composition or the polylactic acid resin molded article according to the present embodiment can be applied to a wide range of applications including a film for a package, a container such as a food tray, a bottle, a lunch box, or a beverage cup, other molded articles for various packages, and various industrial materials.

The invention claimed is:

1. A polylactic acid resin composition obtained by melting a mixture comprising 100 parts by weight of a poly-L-lactic acid (A) having an L-lactic acid purity of 99 mol % or more, 2.6 to 10 parts by weight of a plasticizer (B), and 0.41 to 1.0 part by weight of a lubricant (C), then cooling the mixture to 20 to 40° C., and then heating the mixture to 46 to 70° C.,
wherein the plasticizer (B) is at least one selected from the group consisting of polyethylene glycol and a castor oil-based fatty acid ester, or a mixture thereof,
the lubricant (C) is at least one selected from the group consisting of ethylene bishydroxystearic acid amide, N-stearyl erucic acid amide, N-stearyl stearic acid amide, and ethylene bisstearic acid amide, or a mixture thereof, and
the following conditions (a) and (b) are satisfied:
(a) a haze value at a thickness of 0.3 mm is 5% or less; and
(b) the degree of crystallinity measured by a differential scanning calorimeter is 50 to 70%,
wherein the degree of crystallinity is obtained by measuring crystallization heat quantity ($\Delta Hc$) and melting heat quantity ($\Delta Hm$) when the polylactic acid resin composition is heated at a rate of 10° C./min using a differential scanning calorimeter (DSC) and performing a calculation according the following formula:

degree of crystallinity=(melting heat quantity−crystallization heat quantity)/93×100.

2. The polylactic acid resin composition according to claim 1, wherein a cold crystallization heat generation amount of a poly-L-lactic acid obtained by subjecting the polylactic acid resin composition after cooling and before heating to differential scanning calorimetry at a temperature rising rate of 10° C. per minute is 16 J/g or more.

3. The polylactic acid resin composition according to claim 1, wherein a cold crystallization heat generation amount of a poly-L-lactic acid obtained by subjecting the polylactic acid resin composition after heating to differential scanning calorimetry at a temperature rising rate of 10° C. per minute is 5 J/g or less.

4. The polylactic acid resin composition according to claim 1, wherein the poly-L-lactic acid has a crystal particle diameter of 100 nm or less.

5. The polylactic acid resin composition according to claim 1, wherein the plasticizer (B) has a refractive index of 1.42 to 1.48 at 25° C.

6. The polylactic acid resin composition according to claim 1, further comprising at least one ester selected from the group consisting of a polyglycerol fatty acid ester, a glycerol fatty acid ester, a glycerol diacetomono fatty acid ester, and a sorbitan fatty acid ester, or a mixture thereof.

7. The polylactic acid resin composition according to claim 1, wherein a contact angle of pure water on a surface of the composition measured by a θ/2 method is 60° or less.

8. A polylactic acid resin molded article obtained by further heating the polylactic acid resin composition according to claims 1 to 130 to 160° C. to soften the composition, and then molding and cooling the composition in a die.

9. The polylactic acid resin molded article according to claim 8, wherein the temperature of the die is 30 to 60° C.

10. The polylactic acid resin composition according to claim 1, wherein the degree of crystallinity is a value measured by a differential scanning calorimeter in a sheet having a thickness of 0.3 mm.

* * * * *